United States Patent
Chang et al.

(10) Patent No.: US 7,487,068 B2
(45) Date of Patent: Feb. 3, 2009

(54) INTERFERENCE ELIMINATING METHOD IN ADAPTIVE ARRAY SYSTEM AND ARRAY PROCESSING DEVICE

(75) Inventors: Byong-Kun Chang, Incheon (KR); Chang-Dae Jeon, Incheon (KR)

(73) Assignee: Incheon University Industry Academic Cooperation Foundation, Dohwa-dong, Nam-gu, Incheon (KR)

( * ) Notice: Subject to any disclaimer, the term of this patent is extended or adjusted under 35 U.S.C. 154(b) by 6 days.

(21) Appl. No.: 11/674,980

(22) Filed: Feb. 14, 2007

(65) Prior Publication Data

US 2007/0282546 A1 Dec. 6, 2007

Related U.S. Application Data

(60) Provisional application No. 60/774,554, filed on Feb. 17, 2006.

(51) Int. Cl.
*H04B 15/00* (2006.01)
*G06F 17/00* (2006.01)

(52) U.S. Cl. .................. 702/189; 702/191; 702/194

(58) Field of Classification Search ............. 702/189, 702/79, 191, 194
See application file for complete search history.

(56) References Cited

U.S. PATENT DOCUMENTS

| | | | | |
|---|---|---|---|---|
| 4,353,119 A | * | 10/1982 | Daniel et al. | 702/194 |
| 4,931,977 A | * | 6/1990 | Klemes | 702/195 |
| 5,493,307 A | * | 2/1996 | Tsujimoto | 342/380 |
| 6,177,906 B1 | * | 1/2001 | Petrus | 342/378 |

OTHER PUBLICATIONS

Chang et al., "Performance of DMI and eigenspace-based beamformers", Nov. 1992, IEEE, IEEE Transactions on Antennas and Propagation, vol. 40, issue 11, pp. 1336-1347.*

* cited by examiner

*Primary Examiner*—Hal D Wachsman

(57) ABSTRACT

The present invention relates to an interference eliminating method in an adaptive array system, and an array processing device using the interference eliminating method. A predetermined array weight is applied to signals input through respective array elements, and the respective input signals to which the array weight is applied are added to generate an array output signal. Subsequently, the array weight is updated based on the array output signal and a first convergence parameter for unit gain constraint, and the array weight is updated based on the array output signal and a second convergence parameter for null constraint. Since a process for generating the array output signal is repeatedly performed based on the updated array weight, an interference signal is eliminated from the input signal.

16 Claims, 22 Drawing Sheets
(4 of 22 Drawing Sheet(s) Filed in Color)

INTERFERENCE ELIMINATING METHOD IN ADAPTIVE ARRAY SYSTEM AND ARRAY PROCESSING DEVICE

CROSS-REFERENCE TO RELATED APPLICATION

This application claims priority to and the benefit of U.S. Patent Application No. 60/774,554 filed in the USPTO on Feb. 17, 2006, the entire contents of which are incorporated herein by reference.

BACKGROUND OF THE INVENTION (a) Field of the Invention

The present invention relates to a method for eliminating interference. More particularly, the present invention relates to a method for eliminating an interference signal in adaptive array systems including an antenna array system and an adaptive sensor array system, and an adaptive array processor using the method.

(b) Description of the Related Art

Generally, an interference signal, a path loss, multipath fading, and a signal delay may be generated by radio propagation channel characteristics in areas relating to radar, sonar, and wireless communication. Particularly, since system performance is deteriorated by distortion caused by the interference signal (i.e., a signal that is not required), methods for eliminating the interference signal are actively being studied.

When a signal required at an output of an array system is estimated, a range of correlation between a required signal (hereinafter referred to as an "original signal") and the interference signal affects the estimation. When the interference signal does not correlate to the original signal, the interference signal may be fully estimated at the array output without any distortion while protecting the original signal. For this purpose, a linearly constrained adaptive array processor algorithm has been suggested. Here, in a linearly constrained least mean square (LMS) algorithm, an array weight is updated from a direction for estimating the original signal (i.e., an original signal direction) to a unit gain constraint.

However, when the interference signal partially or completely correlates with the original signal, the original signal may be partially or completely eliminated by correlation between the original signal and the interference signal while adaptively processing a signal input to a system. Therefore, it is difficult to estimate the original signal.

To prevent signal cancellation in a coherent signal environment, a hardware or software approach method may be used in an adaptive array system.

The hardware approach method includes a method using a master-slave type of array processor. In the method, two array processors are required, and one of the two is an adaptive processor and the other is a non-adaptive processor. A master processor uses a phase delay element and subtractive preprocessors to eliminate the original signal in an adaptive process.

Accordingly, the array weight along with subtracted interference is repeatedly updated, and therefore the array weight generated in the master processor is not affected by the original signal. Therefore, the obtained array weight is copied into a slave processor, an input signal including the original signal having passed through the phase or time delay element is processed based on the copied array weight, and the array output is generated.

However, in the above conventional method, there is a problem in that an additional array process is required (i.e., two array processors are required) to prevent the signal cancellation. In addition, compared to a method using one array processor, the number of computations required to generate the array output is large. Further, when the phase or time delay element or the subtractive preprocessors used in the master processor are deteriorated, the partial signal cancellation may be generated by leakage of the original signal, and signal estimation performance is reduced.

A spatial smoothing approach method is used to prevent the signal cancellation. In the spatial smoothing approach method, a subarray preprocessor is used, in which input correlation matrices of a subarray are averaged and the input correlation matrices are nearly diagonal so as not to correlate coherent input signals with each other. Accordingly, since the coherent interference is not correlated after the preprocessor, the coherent interference is efficiently eliminated.

However, in the spatial smoothing approach method, as the number of interference signals increases, it is required to increase the number of subarrays to efficiently eliminate the interference, and therefore the larger number of elements is problematically required. Compared to the method using one array processor, the number of computations is increased by the number of used subarrays.

In addition, a method using a parallel spatial processing algorithm is used to prevent the signal cancellation. In the method, to eliminate the coherent interference, the subarrays are processed in parallel, and delayed outputs of the subarrays are averaged to generate the array output.

The number of computations is not larger than that of the spatial smoothing approach method since the input signal is processed in parallel between the subarrays. However, there is a problem in that the number of elements corresponding to the number of subarrays is required to efficiently eliminate the coherent interference.

As described, according to the prior art, the larger number of elements or an additional array processor is required to eliminate the coherent interference, and therefore the hardware is increased and the larger number of computations is problematically required.

The above information disclosed in this Background section is only for enhancement of understanding of the background of the invention.

SUMMARY OF THE INVENTION

The present invention has been made in an effort to provide a method for efficiently eliminating an interference signal with a simplified configuration of an adaptive array system. In addition, the present invention has been made in an effort to provide a method for efficiently preventing signal cancellation when an interference signal is eliminated, and improving performance of an adaptive array system.

In an exemplary method for eliminating interference from signals respectively input through a plurality of array elements in an adaptive array system including the plurality of array elements according to an embodiment of the present invention, a) an array weight for eliminating the interference is applied to respective input signals and the signals are output, b) the respective input signals to which the array weight is applied are added and an array output signal is generated, c) the array weight is updated based on the array output signal and a first convergence parameter for unit gain constraint, and d) the array weight is updated based on the array output signal and a second convergence parameter for null constraint. Here, a) to d) are performed more than a predetermined number of times based on the updated array weight, and a final array output signal is output.

An exemplary adaptive array processing device according to an embodiment of the present invention eliminates interference of signals input through a plurality of array elements in an adaptive array system including the plurality of array elements. The exemplary adaptive array processing device includes a signal input unit, a signal processing unit, an array output unit, and an array weight updating unit. The signal input unit receives the input signals. The signal processing unit processes the respective input signals based on respective array weights and outputs the signals. The array output unit adds the respective signals processed as the array weight and outputs the signal as an array output signal. The array weight updating unit updates the array weight based on the array output signal and supplies the array weight to the signal processing unit. Here, the array weight updating unit includes a first weight updating unit, a second weight updating unit, and an array weight supply unit. The first weight updating unit processes the array output signal based on a first convergence parameter for unit gain constraint to generate the updated array weight. The second weight updating unit processes the array output signal based on a second convergence parameter for null constraint to generate the updated array weight. The array weight supply unit alternately supplies the updated array weight output from the first weight updating unit and the updated array weight output from the second weight updating unit to the signal processing unit.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

Figure 1:
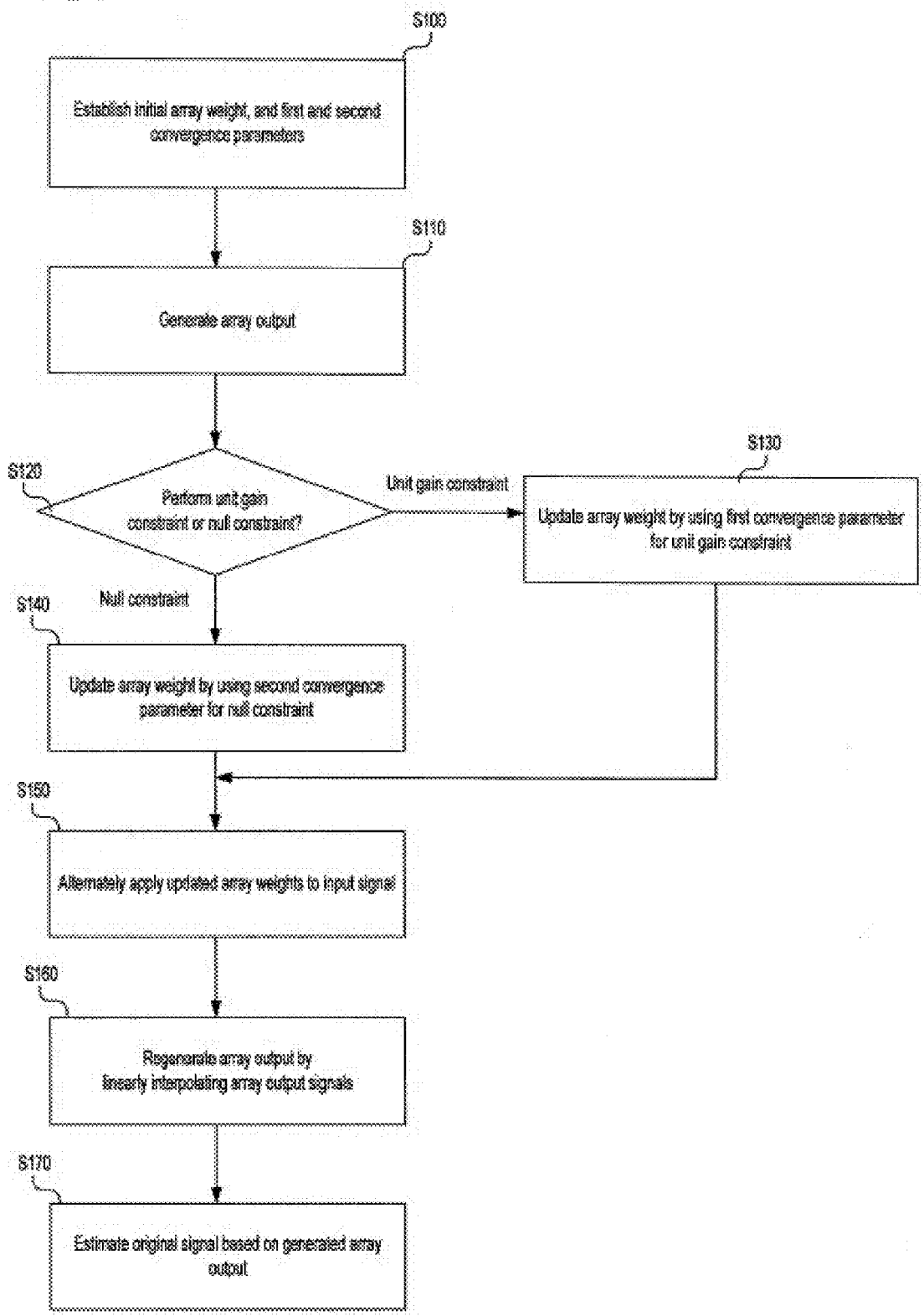
FIG. 1 shows a flowchart representing an interference eliminating method according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In an exemplary embodiment of the present invention, an alternate mainbeam nulling (AMN) algorithm is used to efficiently eliminate an interference signal in an adaptive array system.

In the AMN algorithm, in addition to a unit gain constraint used in a linearly constrained least mean square (LMS) algorithm, since a null constraint is applied in a set direction (here, the set direction may be a look direction, i.e., a direction for estimating an original signal), signal cancellation caused by correlation between the original signal and a coherent interference signal in an adaptive process is reduced.

Since a weight vector is orthogonal to a set direction steering vector, the weight vector is not affected by the original signal when the null constraint is applied to the set direction. Accordingly, compared to the applying of the unit gain constraint to the set direction in a like manner of the linearly constrained LMS algorithm, the signal cancellation is reduced by continuously processing the input signal as the null constraint. By the linearly constrained LMS algorithm, an array weight is repeatedly updated as a unit gain, and the null constraint is alternately applied to the set direction. The array weight is updated for the unit gain constraint and the array weight is alternately updated for the null constraint that is orthogonal to the set direction, and therefore signal estimation performance may be improved in an array output. An output signal generated by the unit gain constraint is linearly interpolated to generate a final array output.

In the AMN algorithm, a convergence parameter for the unit gain constraint is adjusted by using a gradient approach method in a 2-dimensional convergence parameter vector space, and then it is applied to an adaptive algorithm in which the signal estimation performance may be improved. In the exemplary embodiment of the present invention, the convergence parameter for the null constraint and the convergence parameter for the unit gain constraint will be provided to achieve optimum estimation efficiency.

Differing from a conventional method using an additional processor or an additional element (the conventional method may be referred to as a "structural approach method" or a "hardware approach method"), since the AMN algorithm according to the exemplary embodiment of the present invention uses an additional algorithm to eliminate the interference signal, it may be referred to as a vector space approach method or a software approach method.

An interference eliminating method using the AMN algorithm according to the exemplary embodiment of the present invention will now be described.

The interference eliminating method according to the exemplary embodiment of the present invention is divided into two steps. In a first step of the interference eliminating method, the AMN algorithm is performed for initial input data by using the convergence parameter having a fixed value to reach an allowable stable state. In a second step, the AMN algorithm is performed by using the convergence parameter having a variable value.

FIG. 1 shows a flowchart representing the interference eliminating method according to the exemplary embodiment of the present invention (i.e., the AMN algorithm).

Firstly, an initial process for establishing an initial array weight, and first and second convergence parameters $\mu_u$ and $\mu_n$ for unit gain constraint and null constraint, is performed.

After the initial process is performed, the initial array weight is applied to an input signal (e.g., the array weight and the input signal are multiplied), and the input signals to which the array weight is applied are respectively added to generate an array output signal in steps S100 to S110.

Subsequently, the unit gain constraint and the null constraint are alternately performed to update the array weight. In further detail, when the unit gain constraint is performed, the array weight is updated based on the first convergence parameter $\mu_u$ in steps S120 to S130. When the null constraint is performed, the array weight is updated based on the second convergence parameter $\mu_n$ in step S140. The unit gain constraint and the null constraint are performed based on a linearly constraint least mean square (LMS) algorithm.

Then, the array weights updated as described above are alternately applied to the input signal in step S150, and the array output signal is adjusted.

For example, when input signals are received, the array weight updated according to the unit gain constraint is applied to the first input signal, and the array weight updated according to the null constraint is applied to the second input signal. That is, the array weights according to the unit gain constraint and the null constraint are alternately applied to the input signals. In further detail, based on the first input signal, a first output signal is generated by applying the array weight (referring to Equation 3) that is updated according to the unit gain constraint to the second input signal. Based on the first output signal and the second input signal, a second output signal is generated by applying the array weight (referring to Equation 4) updated according to the null constraint to the first input signal. Based on the second output signal and the first input signal, a third output signal is generated by applying the array weight that is updated according to the unit gain constraint to the second input signal. Based on the third output signal and the second input signal, a fourth output signal is generated by applying the array weight updated according to the null constraint to the first input signal. The above processes are repeatedly performed, and the array output signal is adjusted.

A method for alternately applying the array weights may be applied to a narrow band adaptive array processor and a broadband adaptive array processor. The number of array weights updated in the broadband adaptive array processor is M (the number of array weights included in one antenna) times the number of the array weights updated in the narrow band adaptive array processor.

Since the array weights are alternately updated according to the unit gain constraint and the null constraint, a current array output signal and a previous array output signal are linearly interpolated for the unit gain constraint, and the array output signal that is eliminated when the null constraint is performed is generated again in step S160.

Since the above processes are repeatedly performed within a predetermined number of times, a signal attenuation effect between an interference signal and an original signal that are included in the input signal is efficiently prevented, and an optimum array output signal may be obtained. Accordingly, the original signal may be precisely estimated based on the array output signal obtained as above in step S170.

In the interference eliminating method according to the exemplary embodiment of the present invention, the above processes are performed by using the first and second convergence parameters respectively having fixed values to eliminate the interference signal from the input signal (a first step), or the above processes are performed by varying the first and second convergence parameters to eliminate the interference signal from the input signal (a second step). Particularly, in a case of the second step, when the first convergence parameter of the unit gain constraint is less than a predetermined error (i.e., a specified tolerance), the first and second convergence parameters for the unit gain constraint and the null constraint are reestablished such that the second convergence parameter for the null constraint is greater than the first convergence parameter. This operation is performed when input signal power is high, which may be observed by an experimental test.

An adaptive array processing device for processing an input signal based on the interference eliminating method will now be described.

In the exemplary embodiments of the present invention, it is assumed that a limited number of interference signals that are coherent with the original signal are input to arrays forming an adaptive array system from a direction that is different from a set direction (i.e., an original signal direction). The input signal including the original signal and the coherent interference signal is input to each array of the adaptive array system, and the input signal is processed as the array weight to generate the array output signal.

Figure 2:
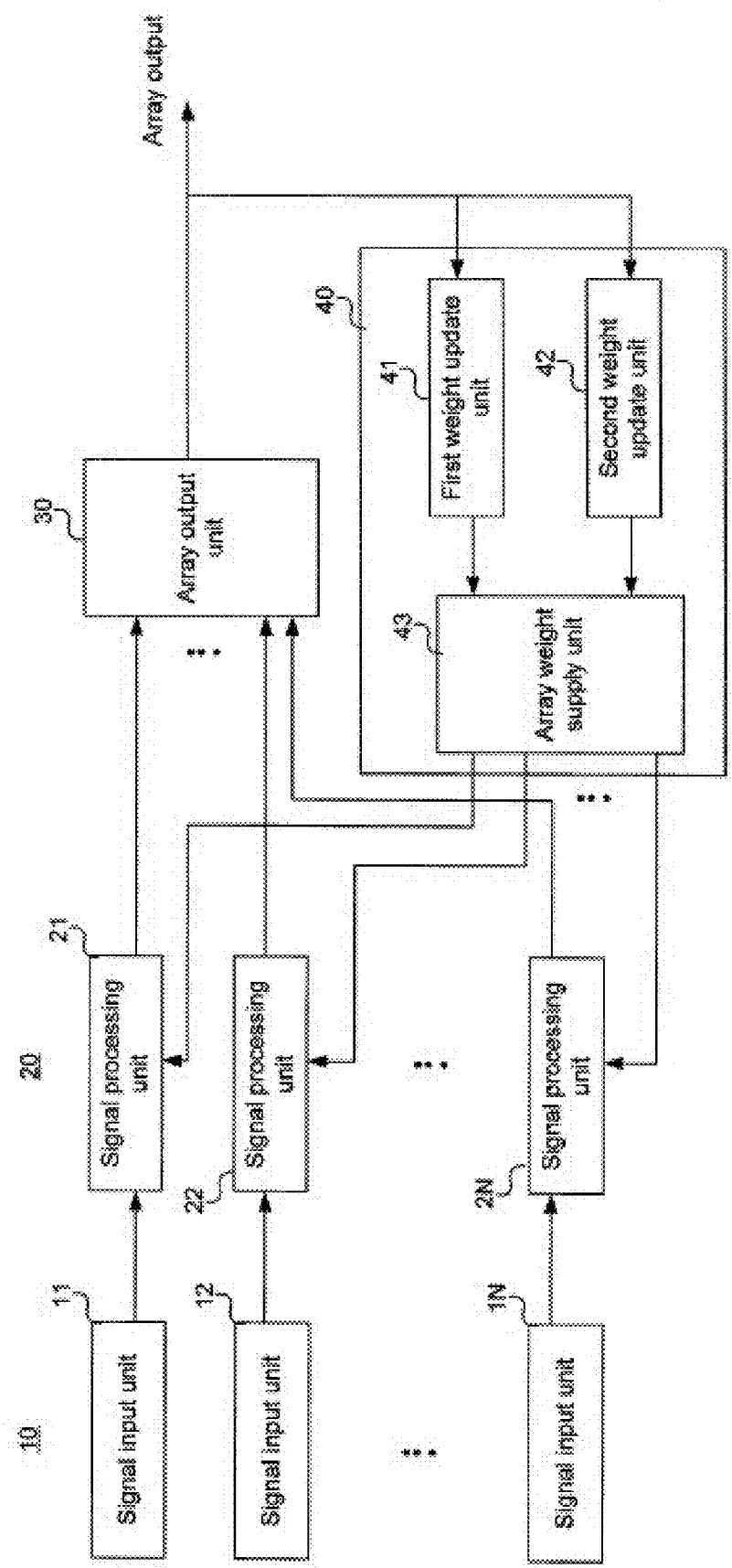
FIG. 2 shows a diagram of a configuration of an adaptive array processing device according to a first exemplary embodiment of the present invention.

FIG. 2 shows a diagram of a configuration of the adaptive array processing device according to a first exemplary embodiment of the present invention. In the first exemplary embodiment of the present invention, a plurality of input signals are received from a narrow band linear array including N isotropic sensors or antennas disposed at the same intervals. Accordingly, the adaptive array processing device according to the first exemplary embodiment of the present invention may be referred to as a narrow band adaptive array processor.

As shown in FIG. 2, the adaptive array processing device according to the first exemplary embodiment of the present invention includes a signal input unit 10 receiving the plurality of input signal input through each array, a signal processing unit 20 for processing the respective input signals based on each array weight, an array output unit 30 for adding the respective signals processed and output as the array weights and outputting them as array output signals, and an array weight updating unit 40 for updating the array weight based on the array output signal and providing the updated array weight to the signal processing unit 20.

Particularly, the array weight updating unit 40 according to the exemplary embodiment of the present invention includes a first weight updating unit 41 for processing the signal output from the array output unit 30 based on the first convergence parameter for the unit gain constraint and updating the array weight, a second weight updating unit 42 for processing the signal output from the array output unit 30 based on the second convergence parameter for the null constraint and updating the array weight, and an array weight supply unit 43 for alternately supplying the updated array weight output from the first weight updating unit 41 and the updated array weight output from the second weight updating unit 42 to the signal processing unit 20.

An operation of the adaptive array processing device according to the first exemplary embodiment of the present invention will now be described.

Figure 3:
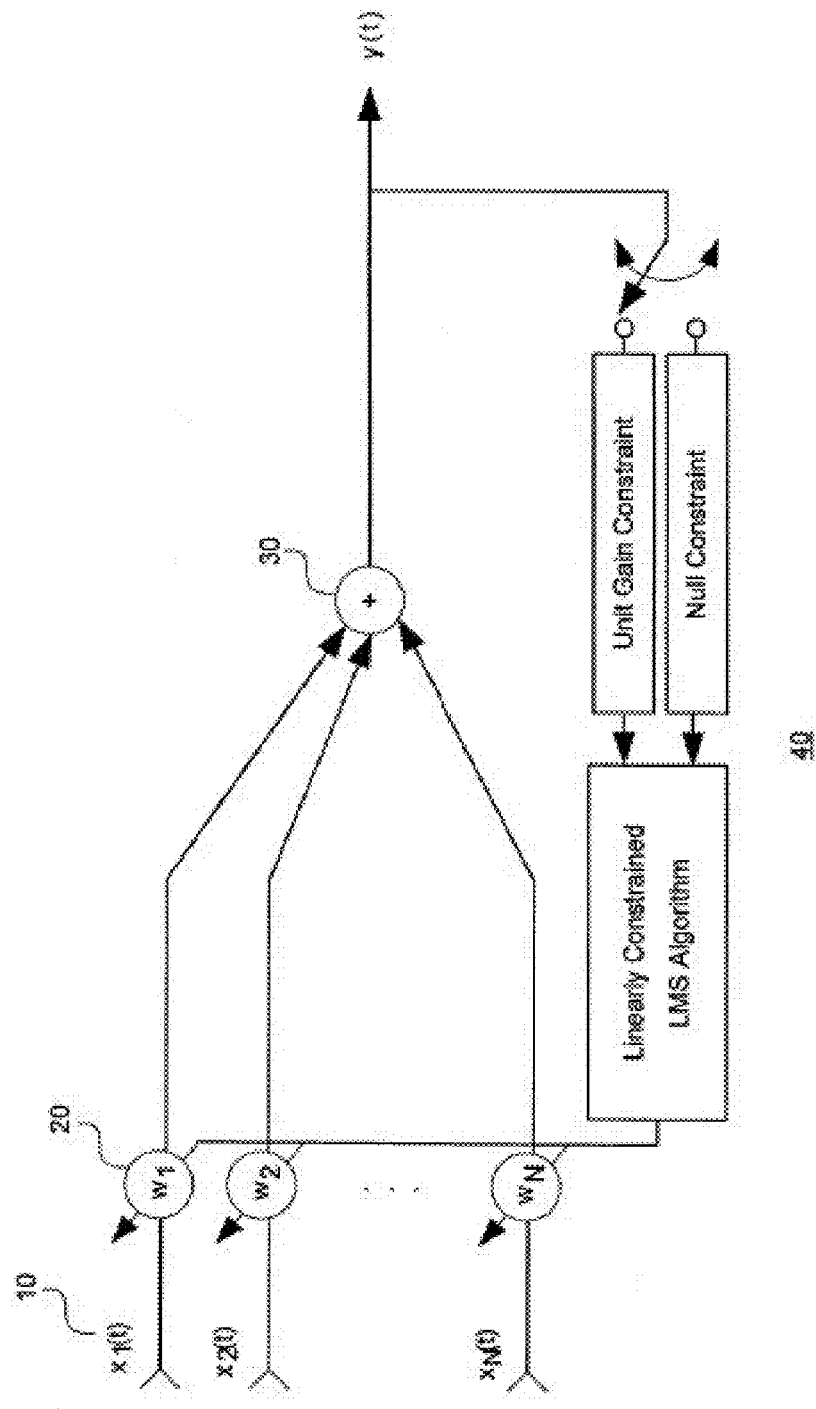
FIG. 3 shows a diagram representing an operational state of the adaptive array processing device according to the first exemplary embodiment of the present invention.

FIG. 3 shows a diagram representing an operational state of the adaptive array processing device according to the first exemplary embodiment of the present invention.

As shown in FIG. 3, respective input signals $X_1(t)$ to $X_N(t)$ input to signal input units 11 to 1N are respectively multiplied by initial array weights $W_1$ to $W_N$ set in signal processing units 21 to 2N to be output. The respective signals output from the signal processing units 21 to 2N are added by the array output unit 30 and output as an array output.

The array output generated by the array output unit 30 is input to the array weight updating unit 40, and the array weight updating unit 40 performs the unit gain constraint and the null constraint for the array input to update the array weight.

In the adaptive array processing device according to the first exemplary embodiment of the present invention (i.e., the narrow band adaptive array processor), each optimum weight vector for minimizing average output power for the unit gain constraint and the null constraint in the set direction may be given as Equation 1 and Equation 2.

$$w_{opt} = \frac{R^{-1}c_l}{c_l^H R^{-1} c_l} \quad \text{[Equation 1]}$$

$$w_{opt} = 0 \quad \text{[Equation 2]}$$

Here, R denotes an input autocorrelation matrix, $c_l$ denotes a steering vector for the set direction, and H denotes a Hermitian transpose.

The first weight updating unit 41 performs the unit gain constraint according to the first convergence parameter based on the linearly constrained LMS algorithm to obtain a suboptimum solution for Equation 1.

The second weight updating unit 42 performs the null constraint according to the second convergence parameter based on the linearly constrained LMS algorithm to obtain a suboptimum solution for Equation 2.

Accordingly, array weights obtained according to the LMS algorithm repeatedly constrained by the unit gain constraint and the LMS algorithm repeatedly constrained by the null constraint in the set direction may be given as Equation 3 and Equation 4.

$$w_{k+1} = \left[I - \frac{c_l c_l^H}{N}\right][w_k - \mu_{u,k} y_k^* x_k] + \frac{c_l}{N} \quad \text{[Equation 3]}$$

$$w_{k+1} = \left[I - \frac{c_l c_l^H}{N}\right][w_k - \mu_{u,k} y_k^* x_k] \quad \text{[Equation 4]}$$

Here, $w_k$ denotes a weight vector at a $k^{th}$ repetition, $x_k$ denotes an input signal vector, I denotes an identity matrix, $y_k$ denotes an array output signal, $\mu_{u,k}$ denotes a first convergence parameter for the unit gain constraint, and $\mu_{n,k}$ denotes a second convergence parameter for the null constraint. In addition, k denotes an index indicating the number of repetitions, and * denotes complex conjugate.

In Equation 4, the unconstrained weight vector calculated as $w_k - \mu_n y_k^* x_k$ is projected on the subspace for the null constraint. A set direction steering vector is perpendicular to the subspace for the null constraint, and therefore the weight vector is perpendicular to the set direction steering vector. Accordingly, when Equation 3 is applied, the signal attenuation may be prevented.

Since the array output is adjusted by alternately applying the unit gain constraint and the null constraint to the constrained LMS algorithm, the original signal is estimated. This operation is repeatedly performed before a suboptimum weight vector is obtained in a stable state.

The adaptive array processing device according to a second exemplary embodiment of the present invention will be described.

In a like manner of the first exemplary embodiment of the present invention, the interference eliminating method based on the AMN algorithm shown in FIG. 1 is applied to the adaptive array processing device according to the second exemplary embodiment of the present invention. However, differing from the first exemplary embodiment of the present invention, the adaptive array processing device according to the second exemplary embodiment of the present invention is formed by the broadband adaptive array processor.

Figure 4:
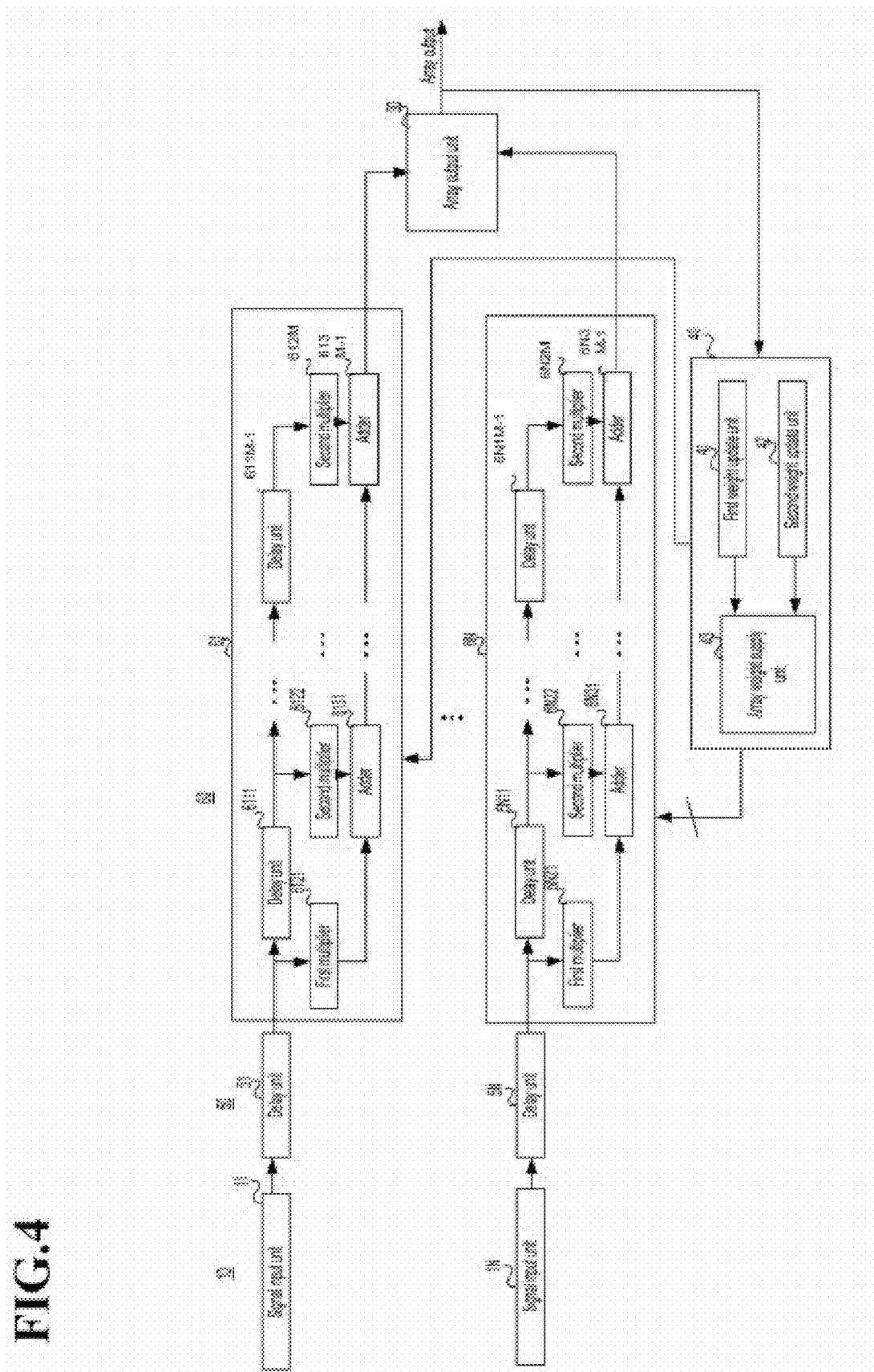
FIG. 4 shows a diagram of a configuration of the adaptive array processing device according to a second exemplary embodiment of the present invention.

FIG. 4 shows a diagram of a configuration of the adaptive array processing device according to the second exemplary embodiment of the present invention. As shown in FIG. 4, in a like manner of the first exemplary embodiment of the present invention, the adaptive array processing device according to the second exemplary embodiment of the present invention includes the signal input unit 10 receiving a plurality of input signals input through each array, a signal processing unit 60, the array output unit 30, and the array weight updating unit 40. However, differing from the first exemplary embodiment of the present invention, a delay unit 50 for delaying the input signal is further provided between the signal input unit 10 and the signal processing unit 60, and a configuration of the signal processing unit 60 is different from that of the signal processing unit according to the first exemplary embodiment of the present invention.

The signal processing unit 60 is formed so as to separately process the respective input signals. One signal processing unit 61 among the signal processing unit 60 shown in FIG. 4 will be exemplified to describe the configuration thereof. The signal processing unit 61 includes a plurality of delay units 6111 to 611M−1 for sequentially delaying the delayed input signal input from the delay unit 50 for a set time and outputting the signal, a first multiplier 6121 for applying the array weight to the signal inputted to one delay unit and outputting the signal, second multipliers 6122, 6123, ..., and 612M2 for applying the array weight to the signal output through a corresponding delay unit and outputting the signal, and adders 6131 to 613M−1 for adding the signals output from the first and second multipliers. The signal output from a first adder is sequentially provided to a second adder, and the second adder adds the signal provided from the first adder and the signal provided from the corresponding first and second multipliers and outputs the added signal to a third adder. Accordingly, a final output of the signal processing unit 61 is output through a last adder 613M−1.

Since the above signal processing unit 60 is provided for each input signal and the array weight output from the array weight updating unit 40 is applied to the corresponding input signal, a plurality of signals are output through the signal processing unit 60 to the array output unit 30.

The array output unit 30 adds the respective signals output from the signal processing unit 60 and outputs the signal as an array output signal, and then the array weight updating unit 40 performs the AMN algorithm according to the exemplary embodiment of the present invention based on the array output signal to update the array weight.

An operation of the adaptive array processing device according to the second exemplary embodiment of the present invention will now be described.

Figure 5:
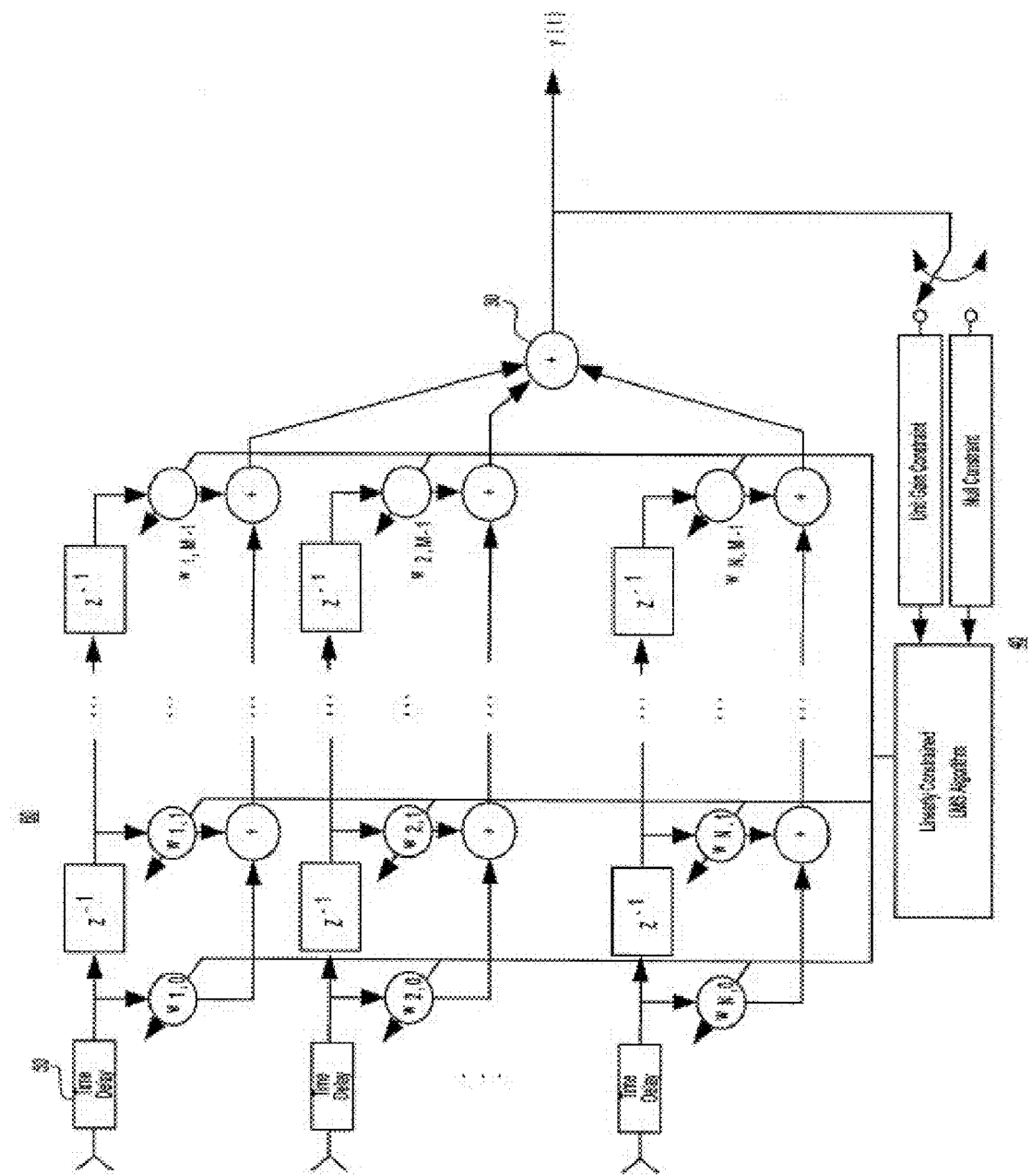
FIG. 5 shows a diagram representing an operational state of the adaptive array processing device according to the second exemplary embodiment of the present invention.

FIG. 5 shows a diagram representing an operational state of the adaptive array processing device according to the second exemplary embodiment of the present invention.

As shown in FIG. 5, signal input units 11 to 1N are respectively delayed by delay units 51 to 5N respectively including a delay filter, and are output to signal processing units 61 to 6N. The input signals are delayed by the delay filter, and therefore the original signals are at the same phase state.

The signals input to the signal processing units 61 to 6N are sequentially delayed by delay units that are unit sample delay elements, and are multiplied by first and second multipliers to generate the array weight. Accordingly, the input signals are added to the delayed input signals multiplied by weight vectors corresponding to the input signals by the last adder.

As described, the signals respectively output through the signal processing unit 60 are added to generate the array output, and the array weight updating unit 40 performs the unit gain constraint and the null constraint for the input array output to generate the array weight.

Respective suboptimum weight vectors for minimizing average output power for the unit gain constraint and null constraint in the set direction in the adaptive array processing device according to the second exemplary embodiment of the present invention (i.e., the broadband adaptive array processor) may respectively be given as Equation 5 and Equation 6.

$$w_{k+1}=[I-C(C^TC)^{-1}C^T][w_k-\mu_{u,k}y_kx_k]+C(C^TC)^{-1}f \quad \text{[Equation 5]}$$

$$w_{k+1}=[I-C(C^TC)^{-1}C^T][w_k-\mu_{u,k}y_kx_k] \quad \text{[Equation 6]}$$

Here, C denotes a constraint matrix, f denotes a constraint vector, and T denotes a transpose. A process for adjusting a weight is similar to that of the narrow band adaptive array processor.

In the AMN algorithm according to the exemplary embodiment of the present invention, the convergence parameter for the unit gain constraint is repeatedly updated by using a gradient approach method and the convergence parameter for the null constraint is fixed in the sense that the optimum solution is solved by the unit gain constraint and the signal cancellation is prevented by the null constraint. The convergence parameter is updated, and an average squared error between a processor output and a reference output is determined. The reference signal may be the original signal (i.e., a training sequence of a global system for mobile communication (GSM), or may be a signal correlated with the original signal. The convergence parameter for the unit gain constraint or the null constraint may be repeatedly updated as given as Equation 7.

$$\mu_{x,k+1}=\mu_{x,k}-\eta \hat{\nabla}_{x,k} \quad \text{[Equation 7]}$$

Here, $\hat{\nabla}_{x,k}$ denotes a $k^{th}$ gradient estimated for each constraint, where x is u for the unit gain constraint or x is n for the null constraint, and η denotes a convergence parameter for $\mu_{x,k}$.

The gradient is estimated by the average squared error ratio for the set convergence parameter in a two-dimensional convergence parameter space during a fixed period at a unit gain or null constraint axis.

Figure 6:
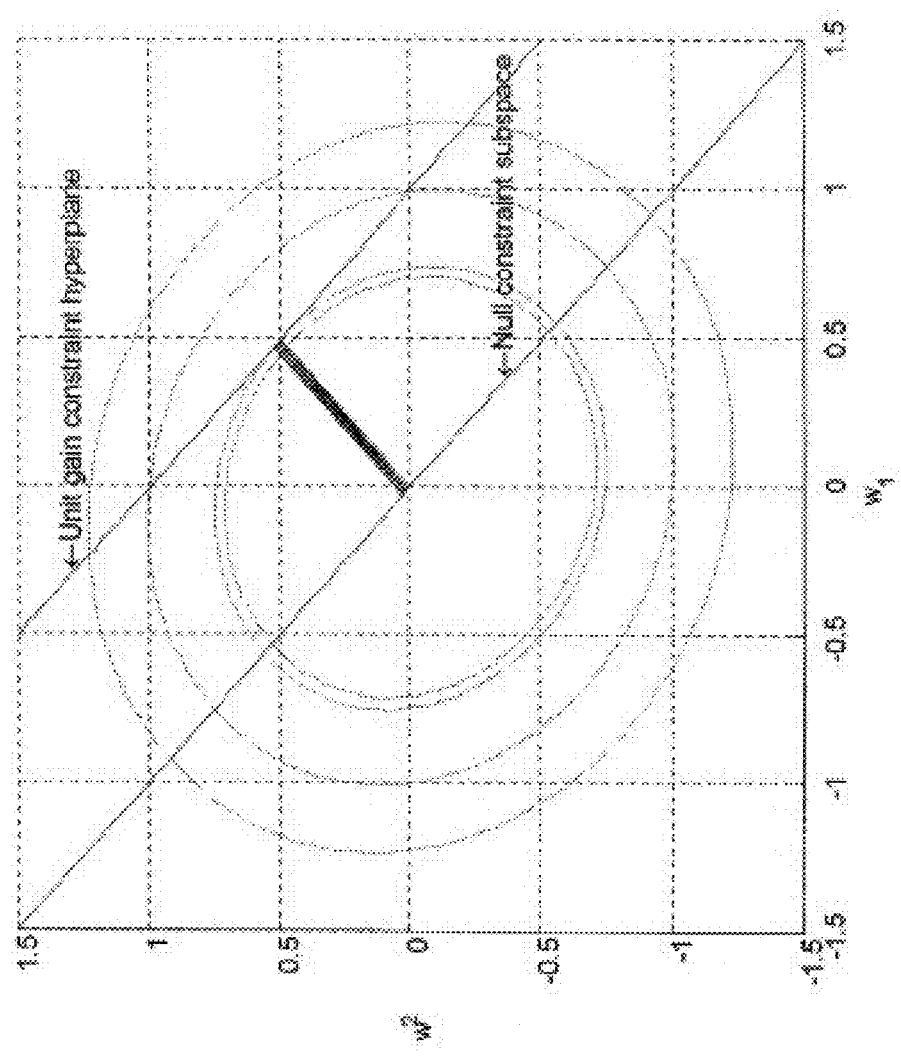
FIG. 6 shows a diagram representing an interference eliminating method according to the exemplary embodiment of the present invention when it is performed in a two dimensional weight vector space.

The performance of the interference eliminating method according to the exemplary embodiments of the present invention (i.e., the AMN algorithm) is verified by performing a computer simulation using Matlab. FIG. 6 shows a diagram representing a result of the interference eliminating method according to the exemplary embodiment of the present invention when it is performed in a two-dimensional weight vector space. In further detail, it shows a result of the interference eliminating method according to the exemplary embodiment of the present invention when it is performed according to the AMN algorithm in the two-dimensional weight vector space. Here, a trajectory of the array weight is shown between a unit gain constraint plane and a null constraint subspace on a level curve set of a performance surface.

The narrow band linear array including 7 isotropic sensors arranged with the same intervals in a coherent signal environment is used. It is assumed that a sinusoidal signal of amplitude of 0.1 is received as the original signal at an array vertical line. In addition, it is assumed that the coherent interference signal is the same as the original signal, and the number of coherent interference signals is within a range of 2 to 40.

Figure 7:
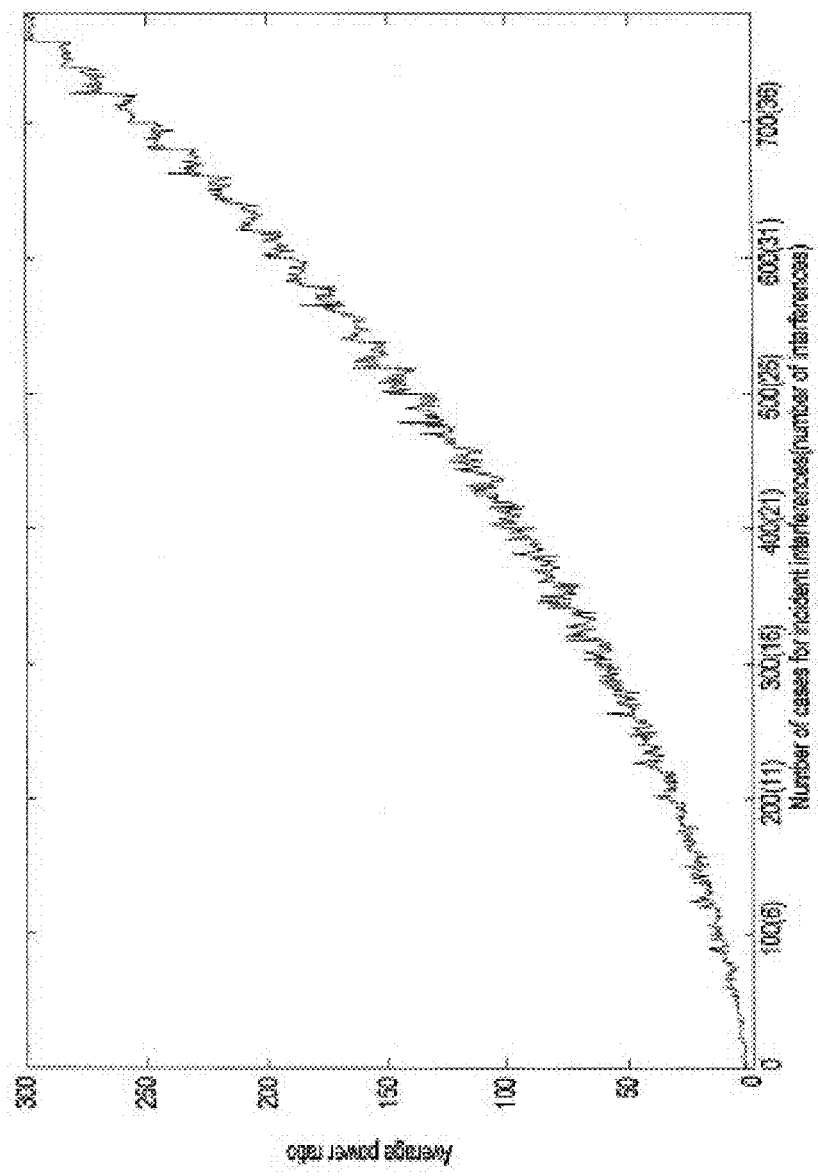
FIG. 7 shows a diagram representing an average power ratio of an input signal to an original signal for all sensors in a simulation of the exemplary embodiment of the present invention.

Twenty respective incident angles randomly selected for the respective coherent interference signals are applied and tested, and therefore 780 cases are tested. Each performance according to the test is shown in FIG. 7. FIG. 7 shows a diagram representing the average power ratio of the input signal to the original signal for all the sensors in the simulation of the exemplary embodiment of the present invention.

Figure 8:
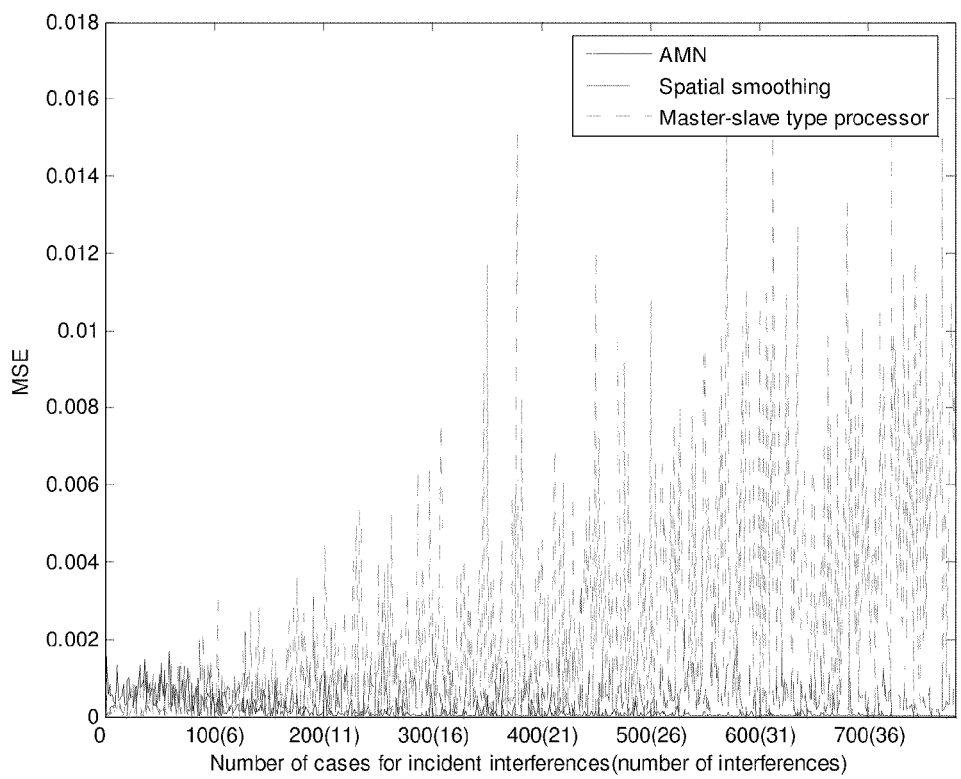
FIG. 8 and FIG. 9 respectively show diagrams comparing an average squared error of the interference eliminating method according to the exemplary embodiment of the present invention and average squared errors of conventional methods.
Figure 9:
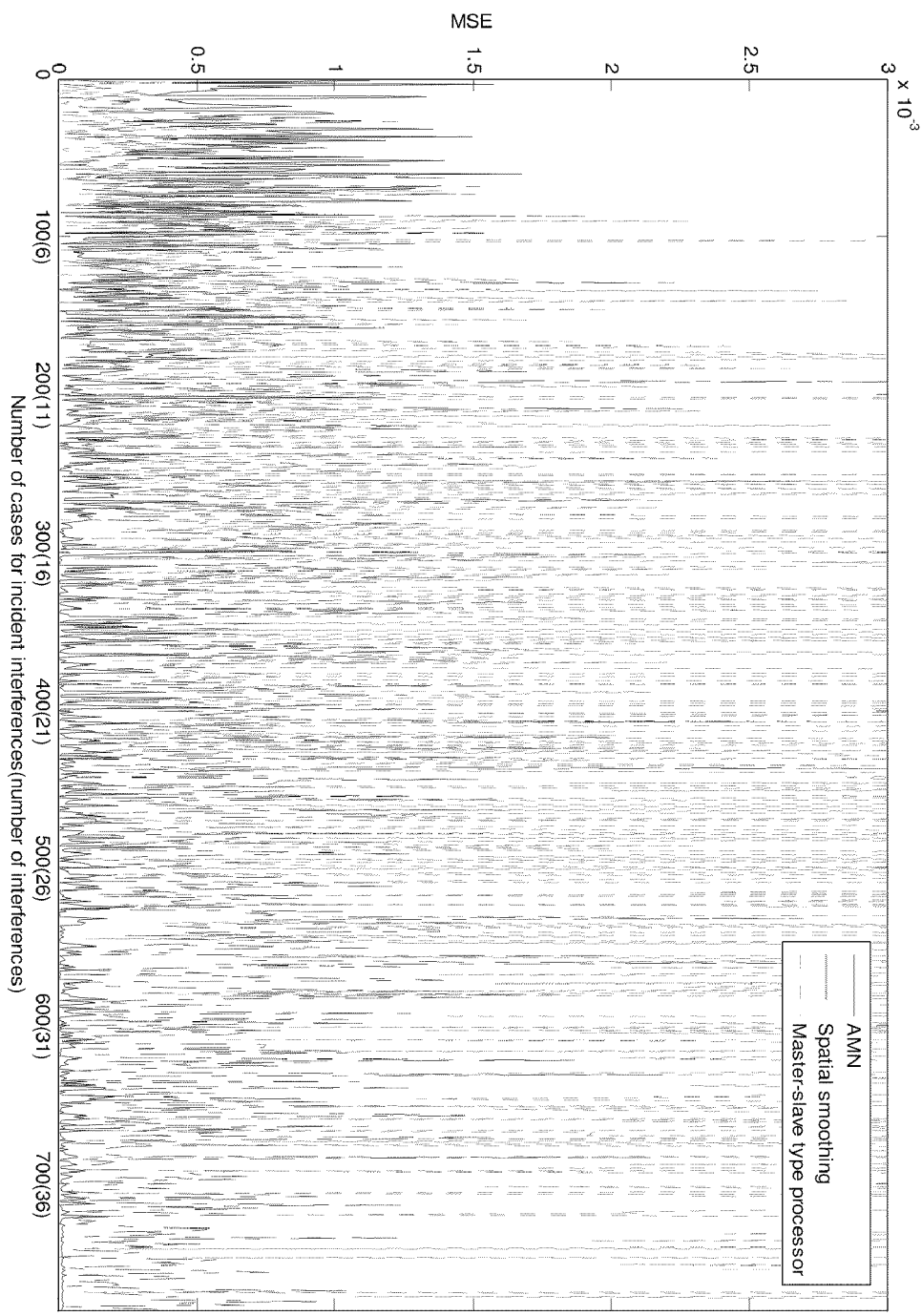

FIG. 8 shows a diagram comparing an average squared error of the AMN algorithm according to the exemplary embodiment of the present invention, and average squared errors of the conventional master-slave type array processor and the spatial smoothing approach method. FIG. 9 is an expanded diagram of FIG. 8. It is assumed that an initial array weight, $\mu_u$, $\mu_n$, and η respectively are 1/7, 0.0015, 0.0015, and $10^{-4}$. A set convergence parameter period for estimating a gradient for the unit gain constraint is set as $1.2 \times 10^{-4}$.

As shown in FIG. 8 and FIG. 9, for five or more interference signals, the AMN algorithm according to the exemplary embodiment of the present invention achieves higher performance than the conventional methods. A difference between minimum square error (MSE) performance of the AMN algorithm according to the exemplary embodiment of the present invention and the MSE performance of other methods increases as the number of interferences increases.

Figure 10:
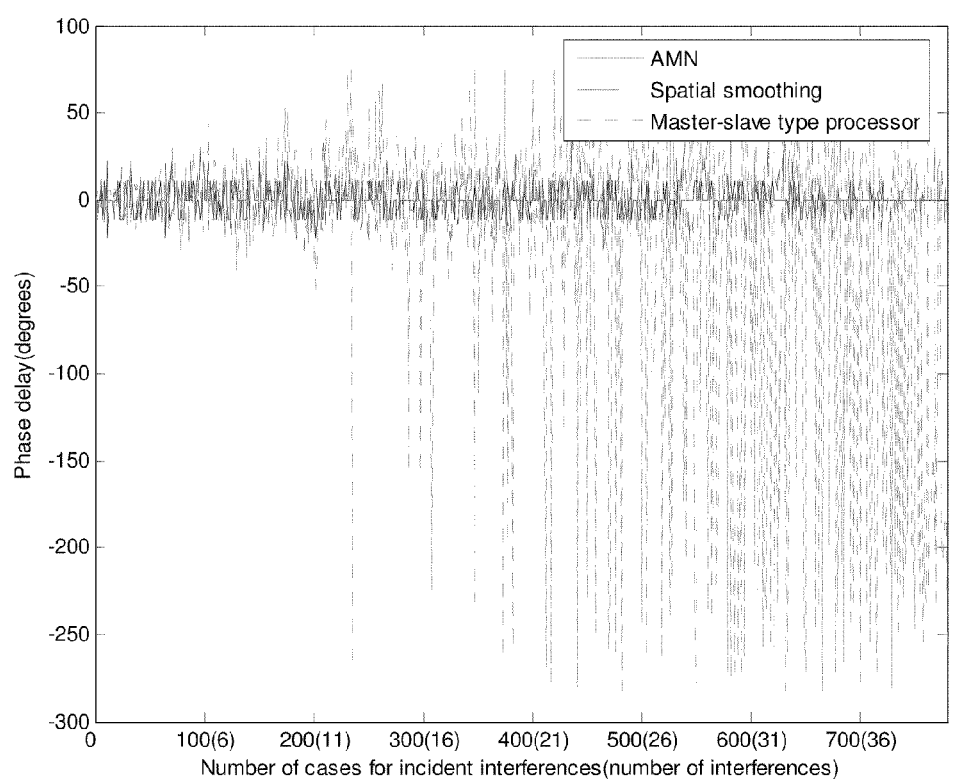
FIG. 10 and FIG. 11 respectively show diagrams representing a phase delay of an output signal to the original signal.
Figure 11:
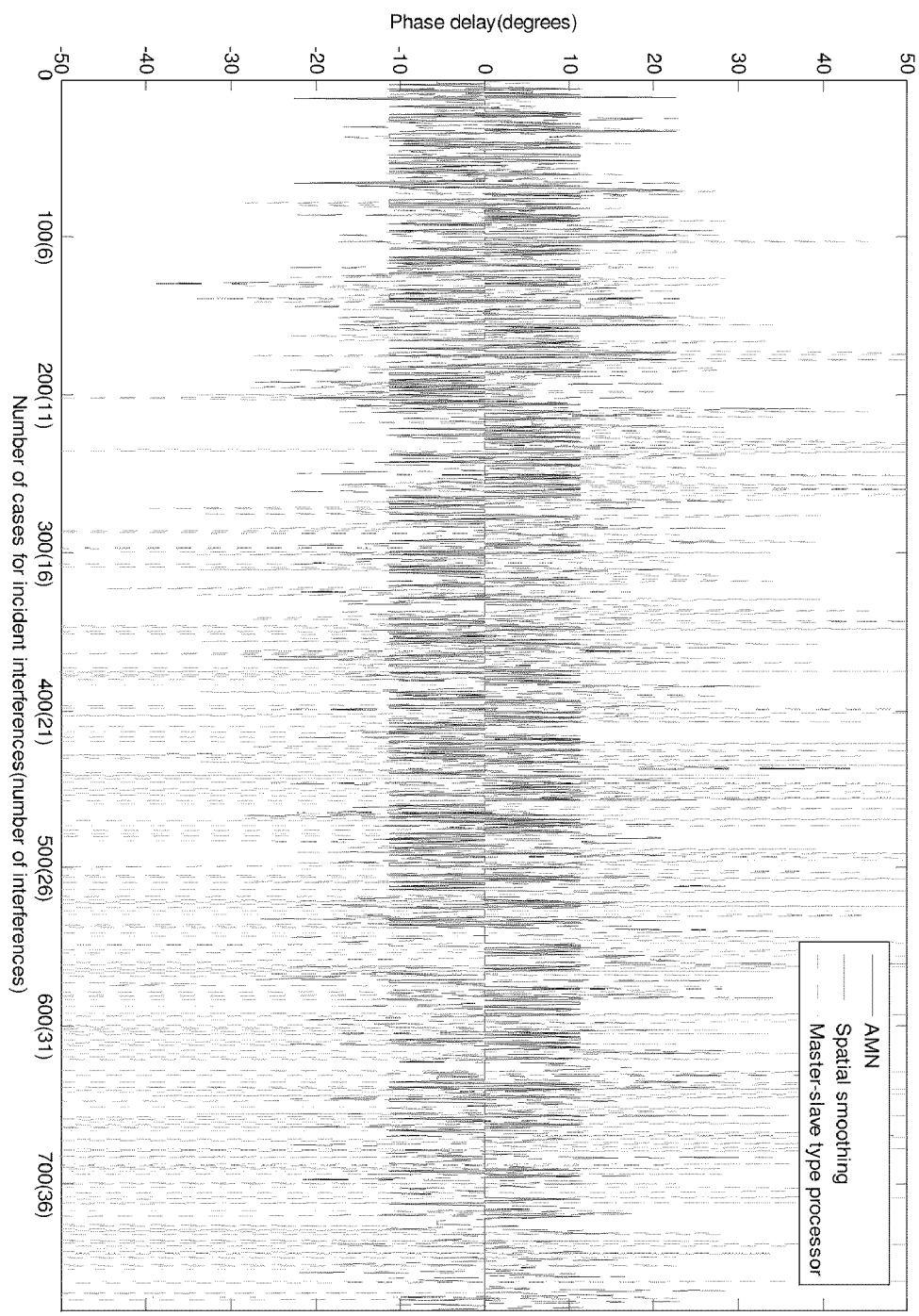

FIG. 10 shows a diagram representing a phase delay of an output signal to the original signal, and FIG. 11 is an expanded diagram of FIG. 10. As shown in FIG. 10 and FIG. 11, compared to the AMN algorithm according to the exemplary embodiment of the present invention, a delay of 11.5° (two samples) is consistently generated. As the number of interferences increases, the performance of the AMN algorithm according to the exemplary embodiment of the present invention increases compared to the conventional method.

Figure 12:
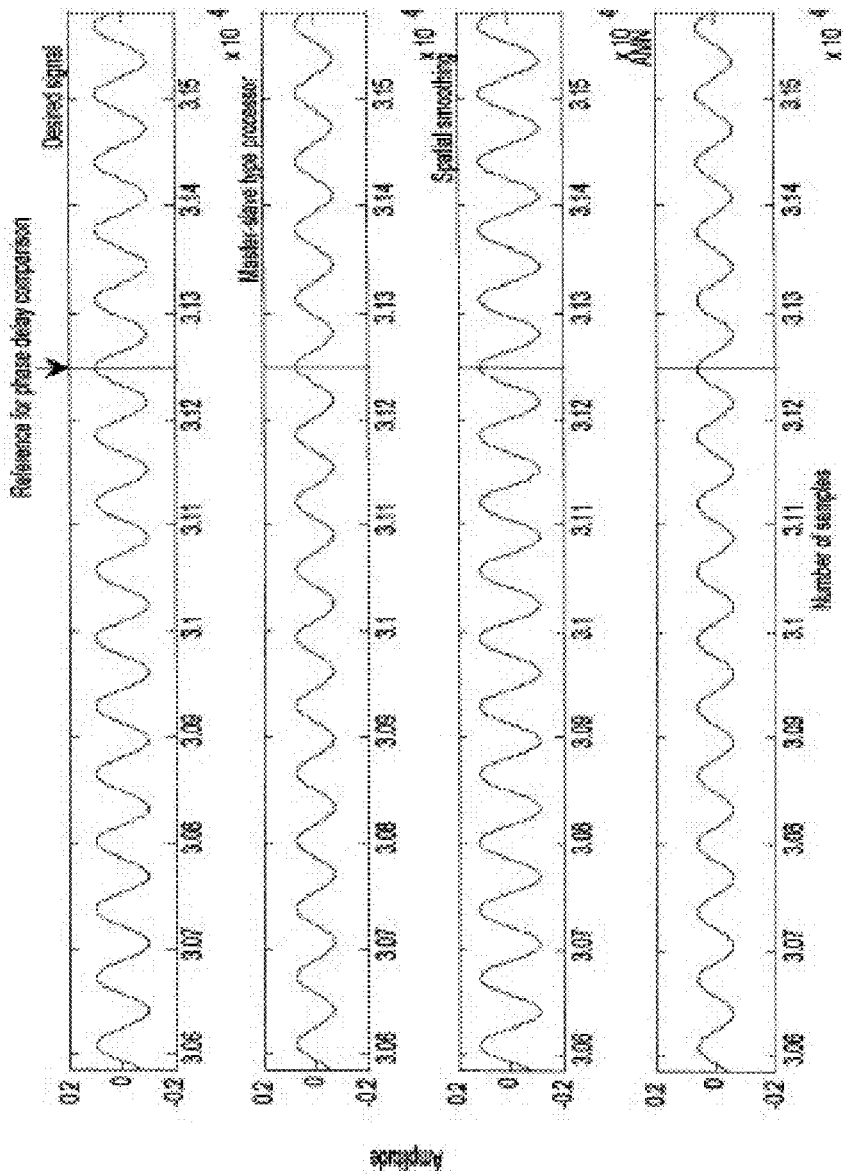
FIG. 12 to FIG. 14 respectively show diagrams representing output signals having the original signal, appropriate error signals, and beam patterns.
Figure 13:
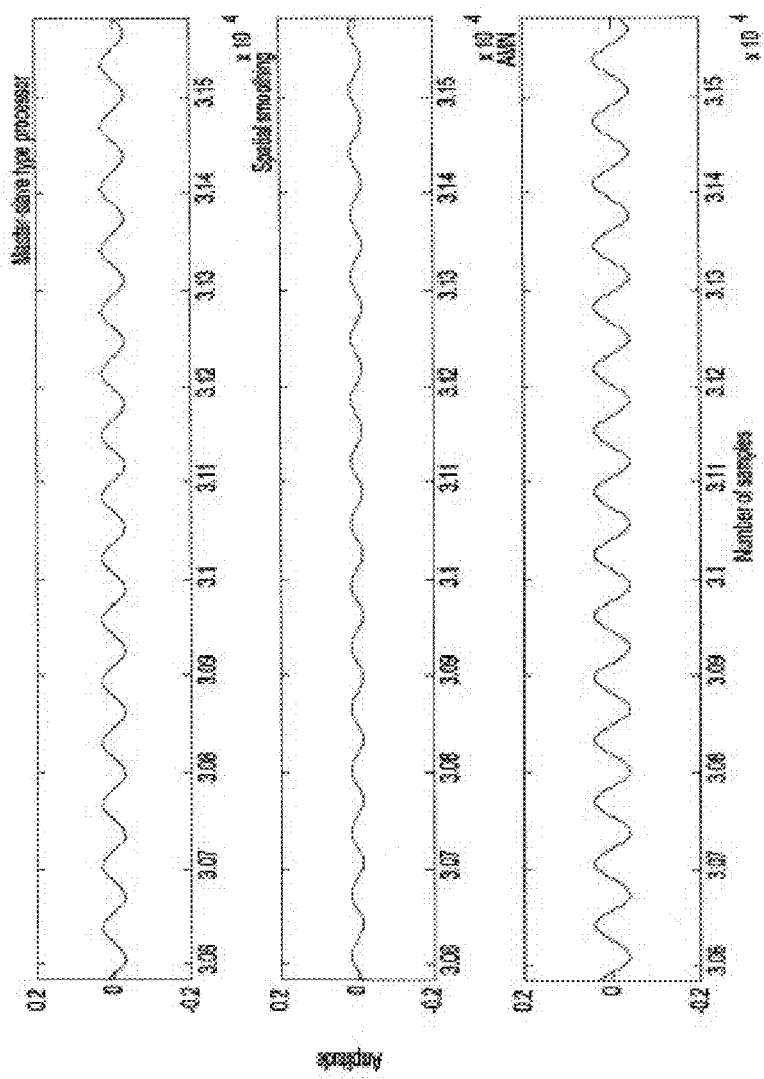
Figure 14:
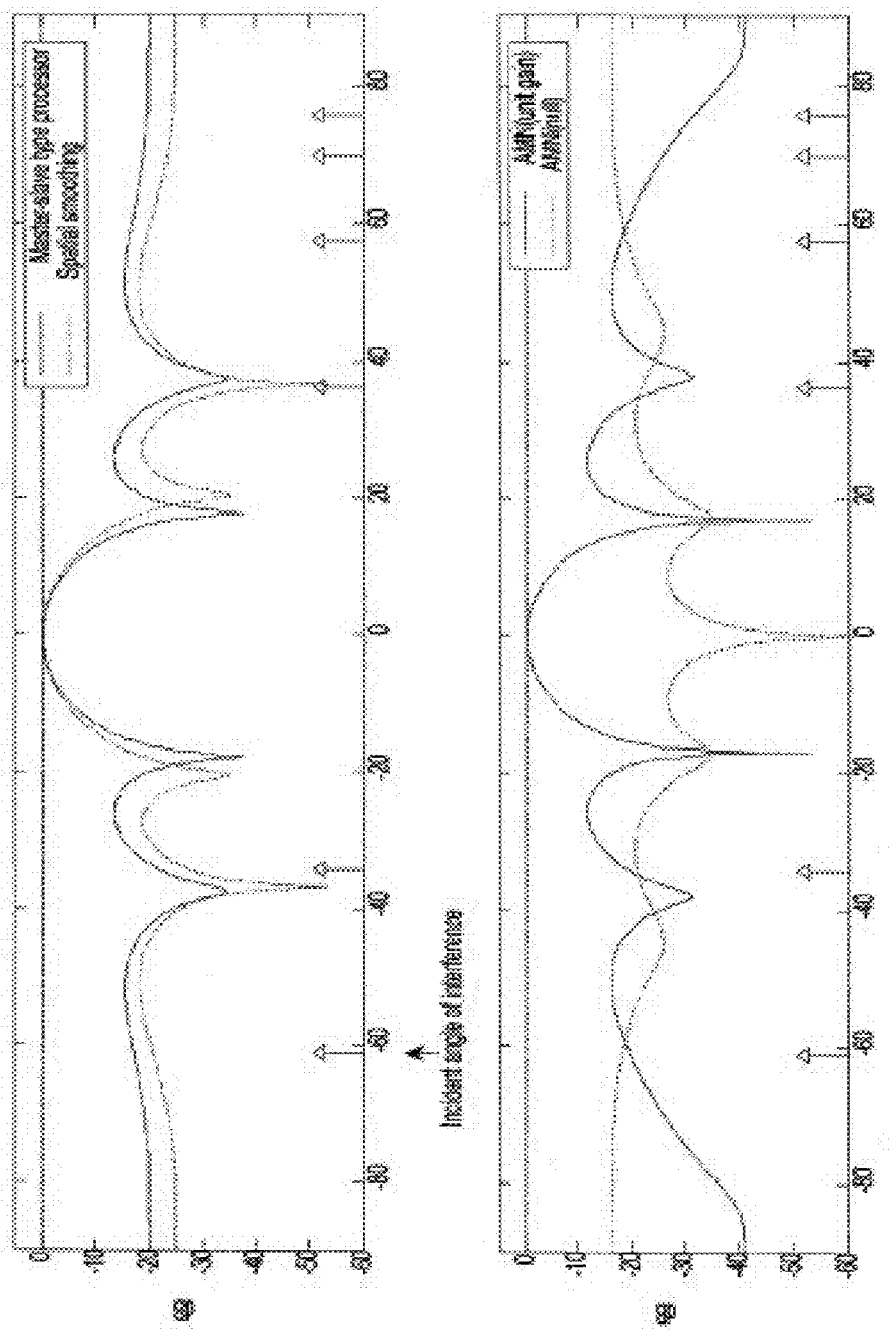
Figure 15:
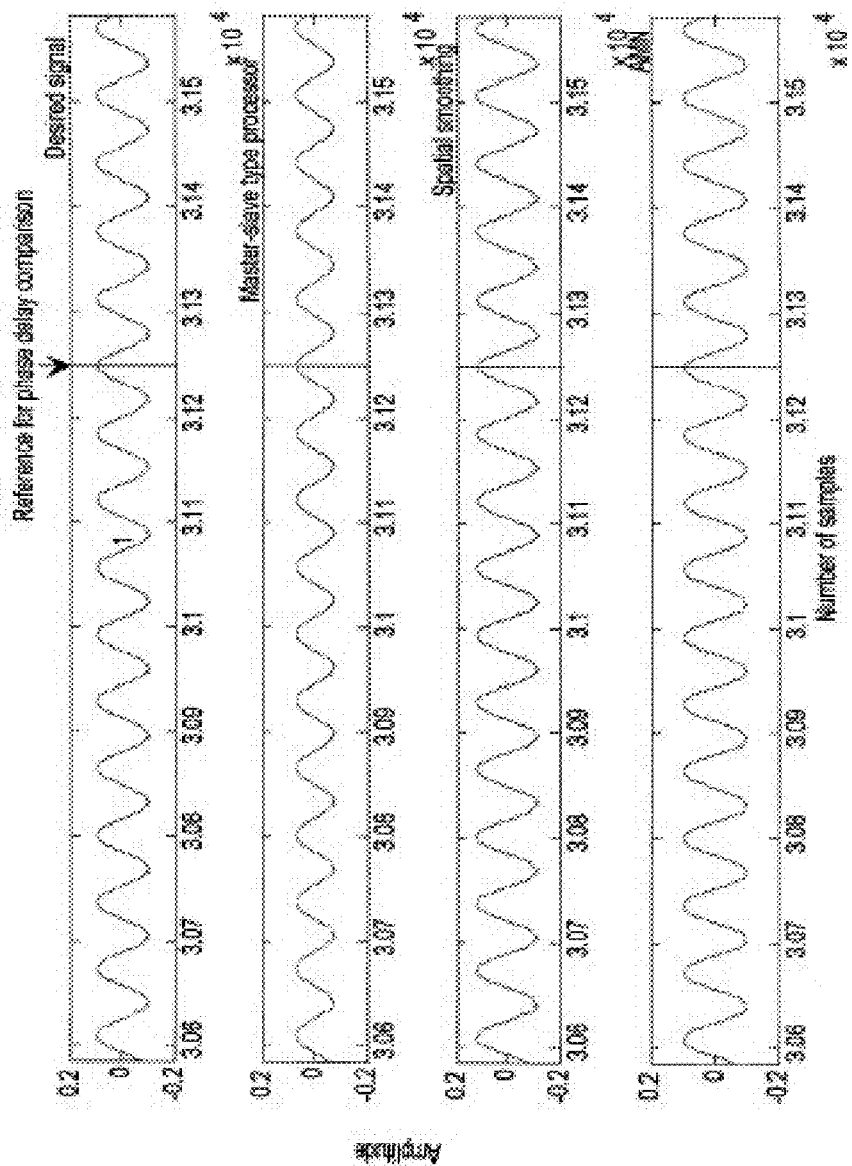
FIG. 15 to FIG. 22 respectively show diagrams representing results when $\mu_u$ and $\mu_n$ are manually adjusted in the same condition as FIG. 12 and FIG. 13.
Figure 16:
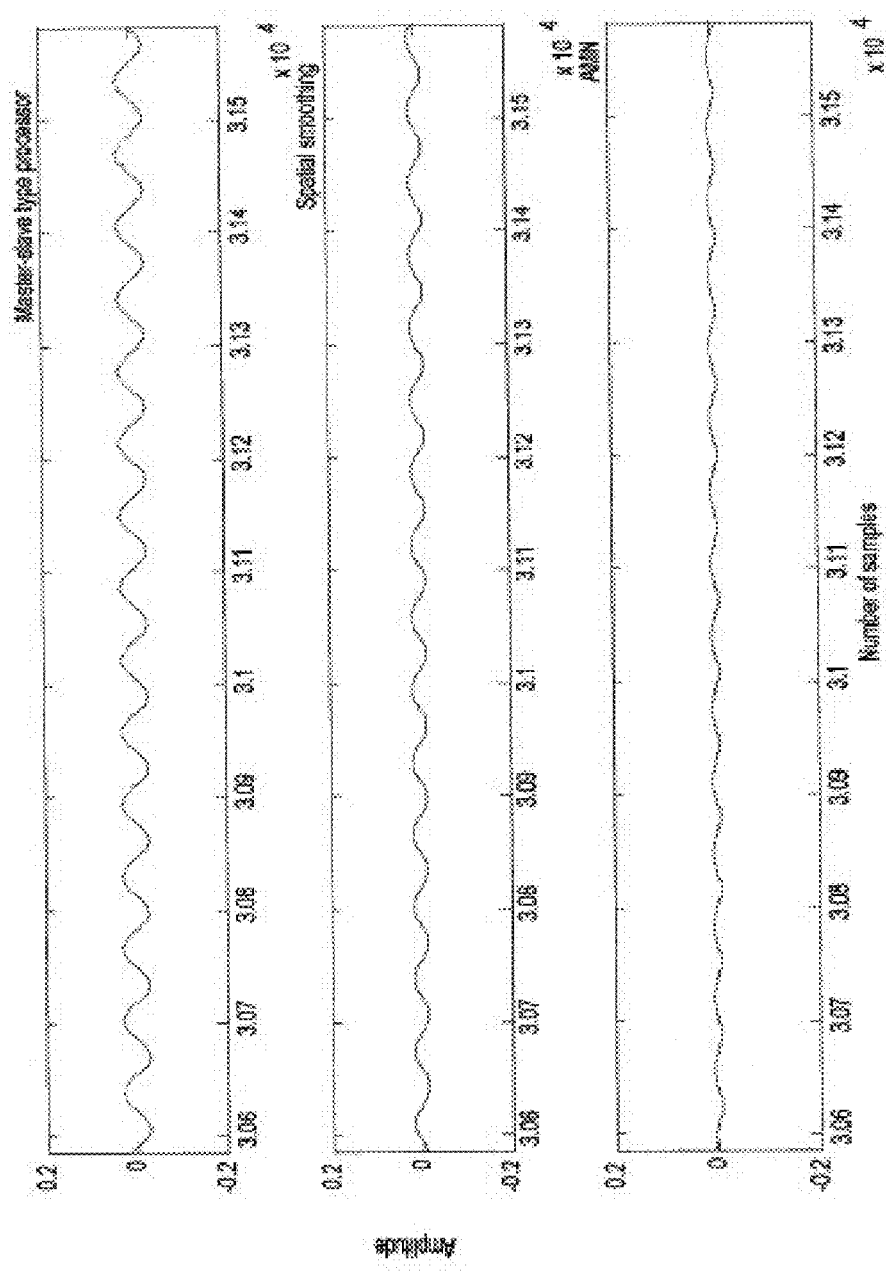

FIG. 12 to FIG. 14 respectively show diagrams representing output signals having the original signal, appropriate error signals, and beam patterns in a case of six interference signals having the average power ratio of 11.2. FIG. 15 and FIG. 16 respectively show diagrams representing results when $\mu_u$ and $\mu_n$ are manually adjusted in the same condition as FIG. 12 and FIG. 13.

As shown in FIG. 12 and FIG. 13, the best performance is achieved in the spatial smoothing approach method, and the performance of the master-slave type processor is better than that of the AMN algorithm according to the exemplary embodiment of the present invention. However, when $\mu_u$ and $\mu_n$ are adjusted as shown in FIG. 15 and FIG. 16, the best performance is achieved in the AMN algorithm according to the exemplary embodiment of the present invention. Based on the above result, $\mu_u$ and $\mu_n$ cause the best MSE performance.

Figure 17:
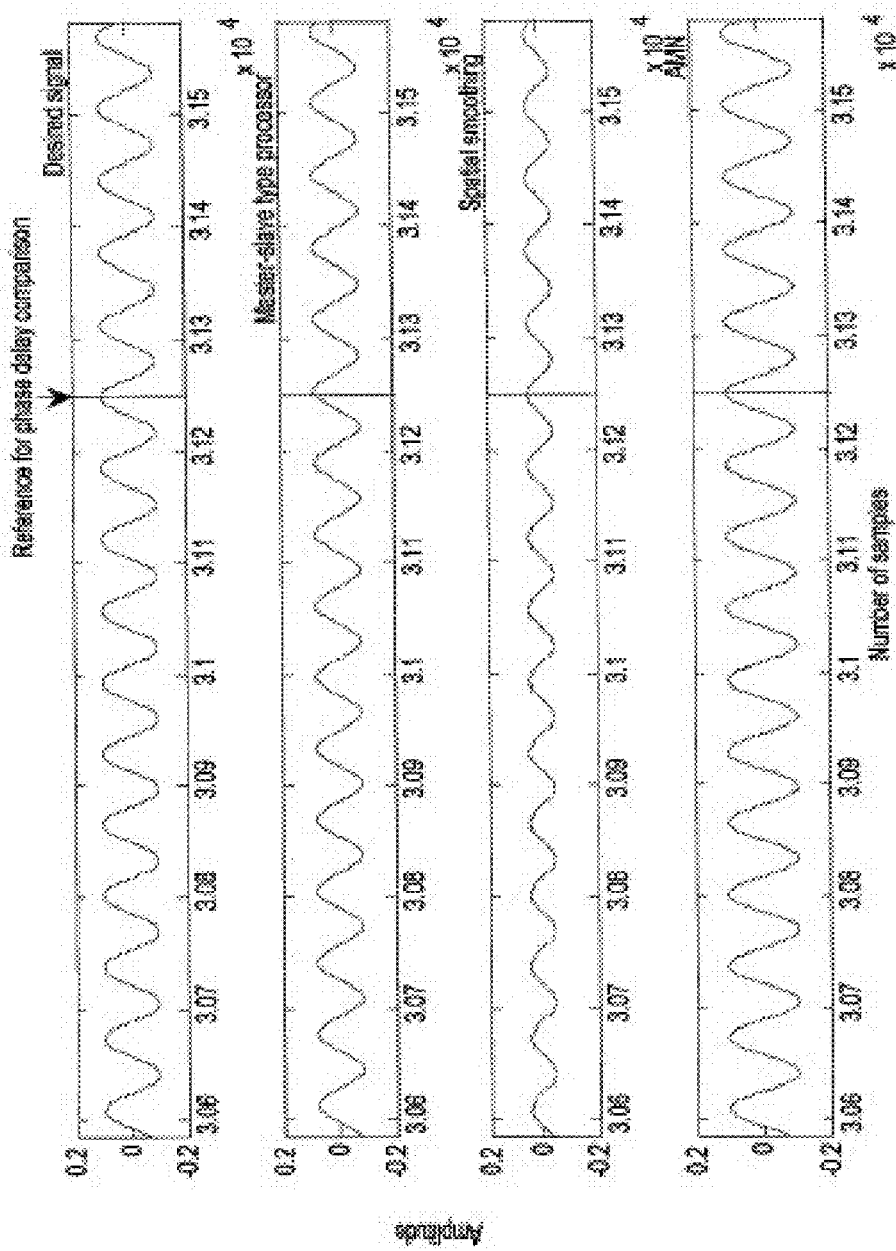
Figure 18:
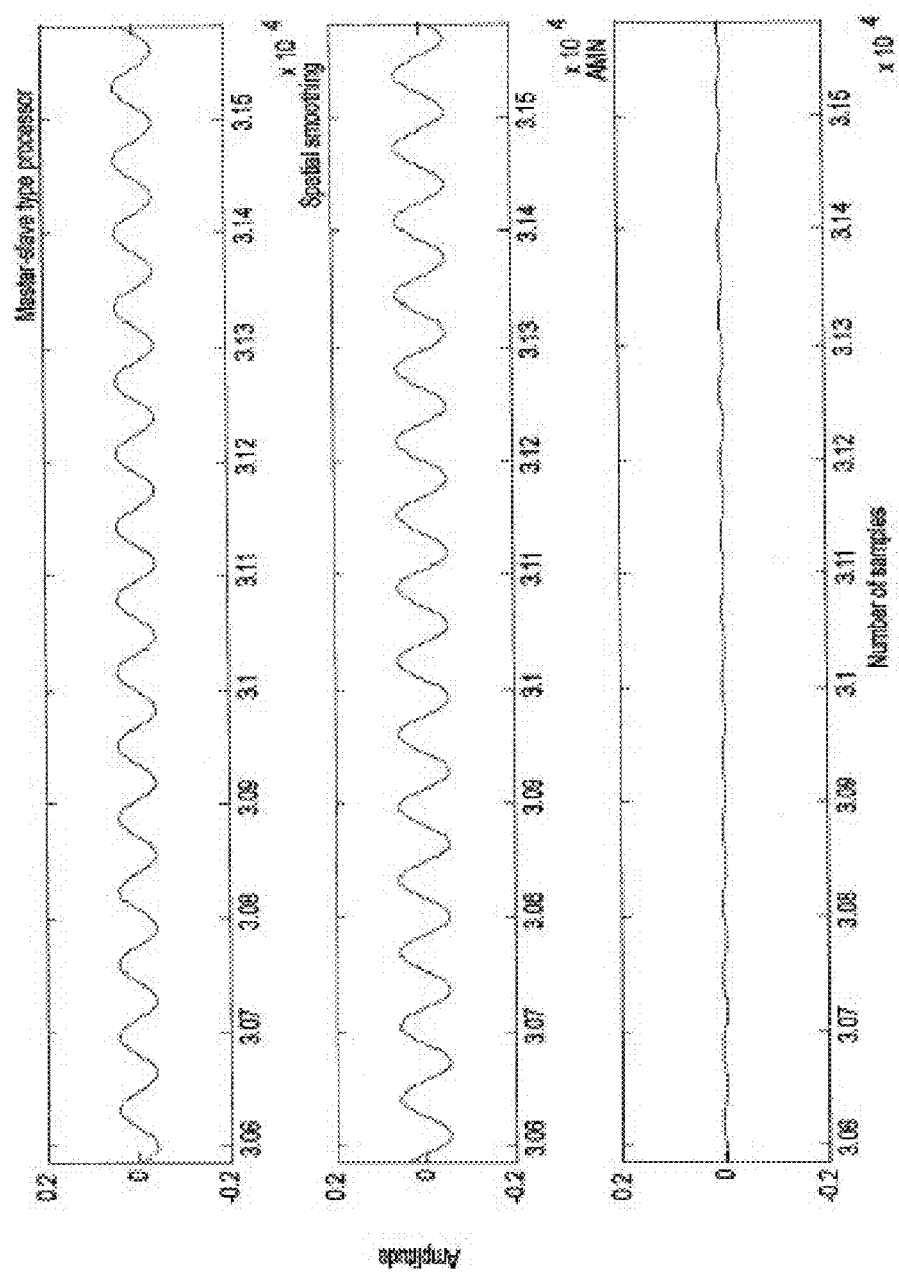
Figure 19:
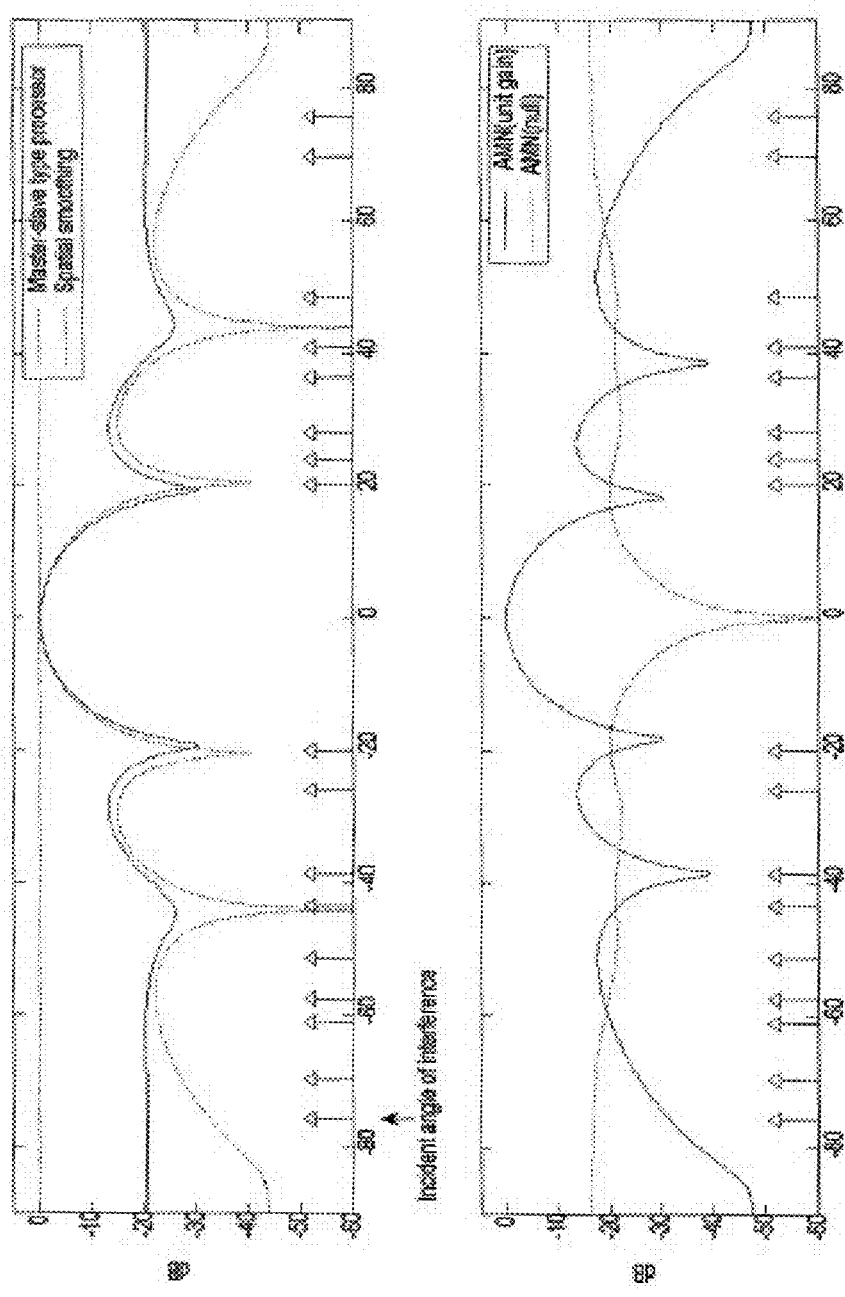
Figure 20:
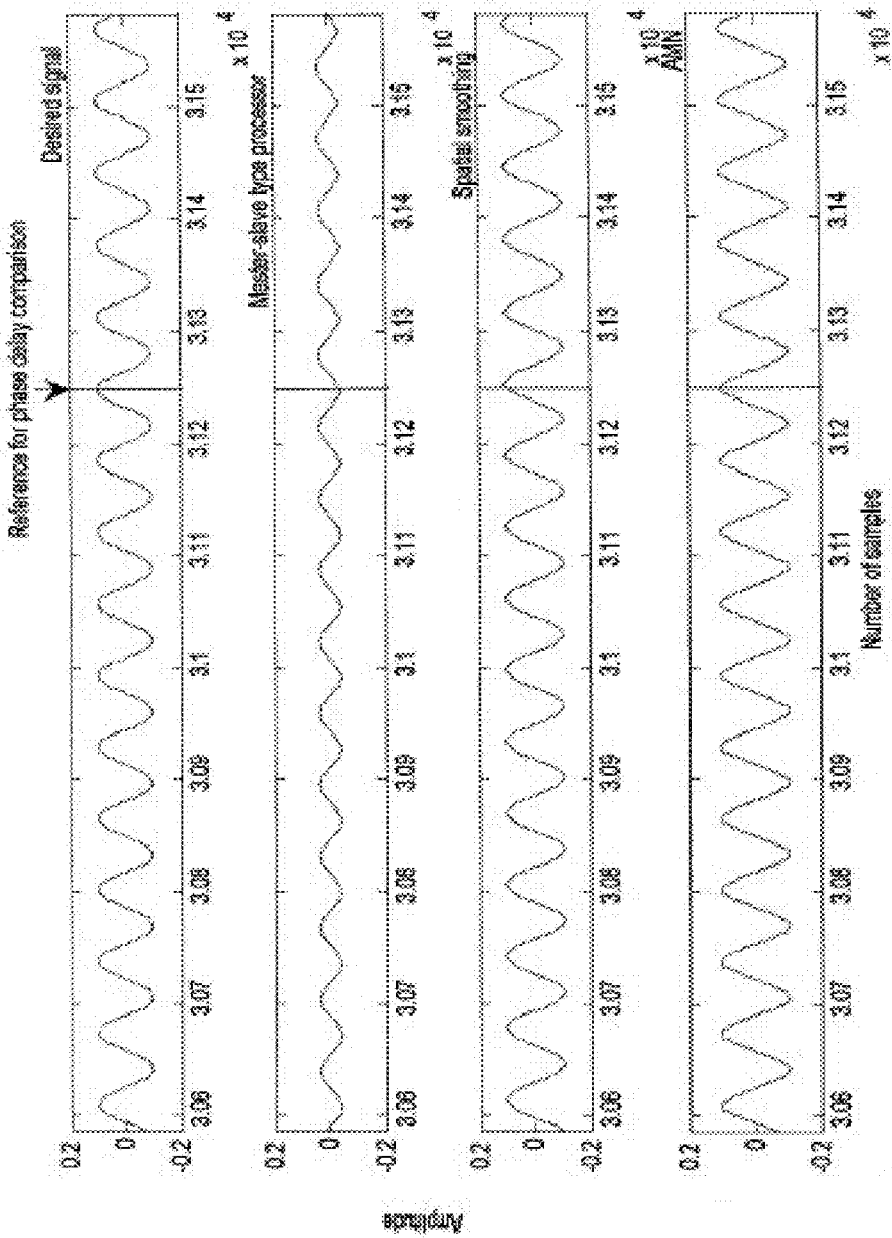
Figure 21:
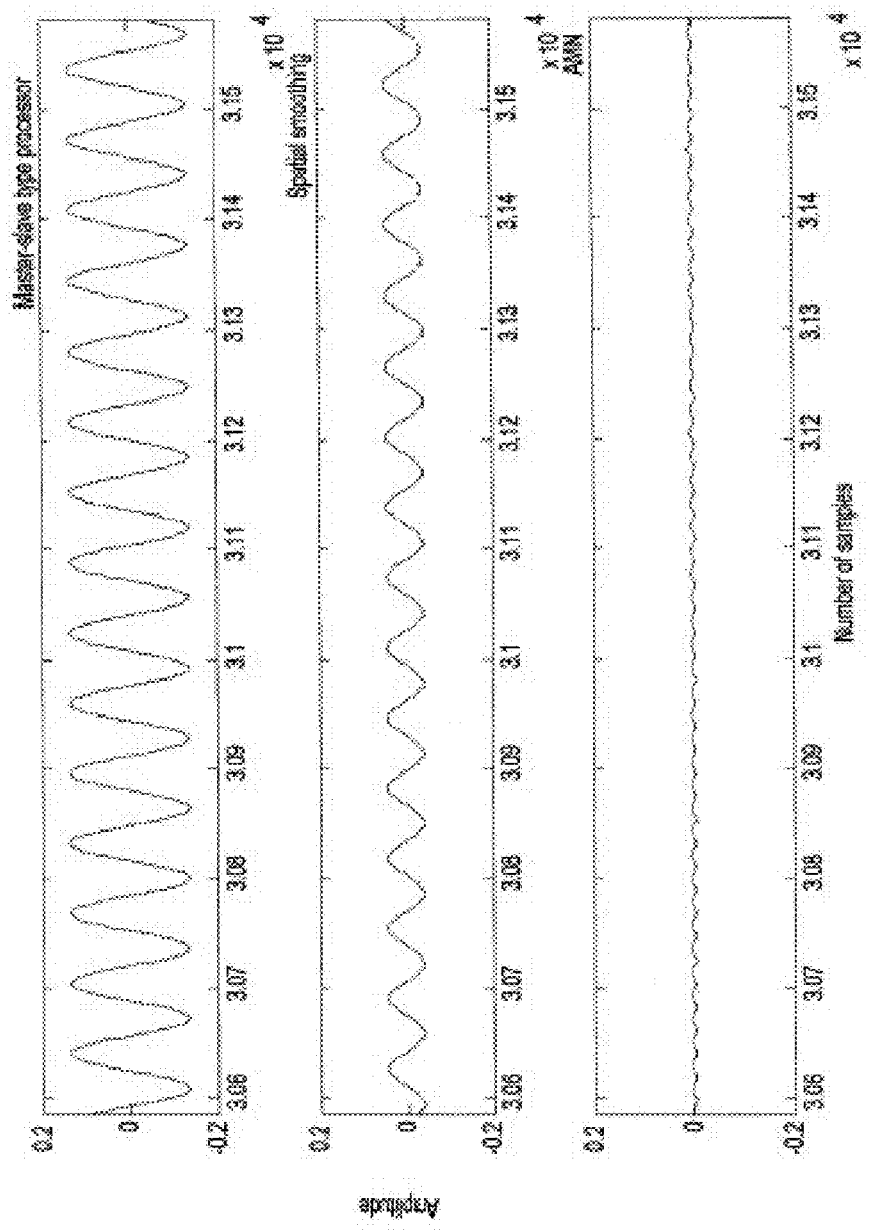
Figure 22:
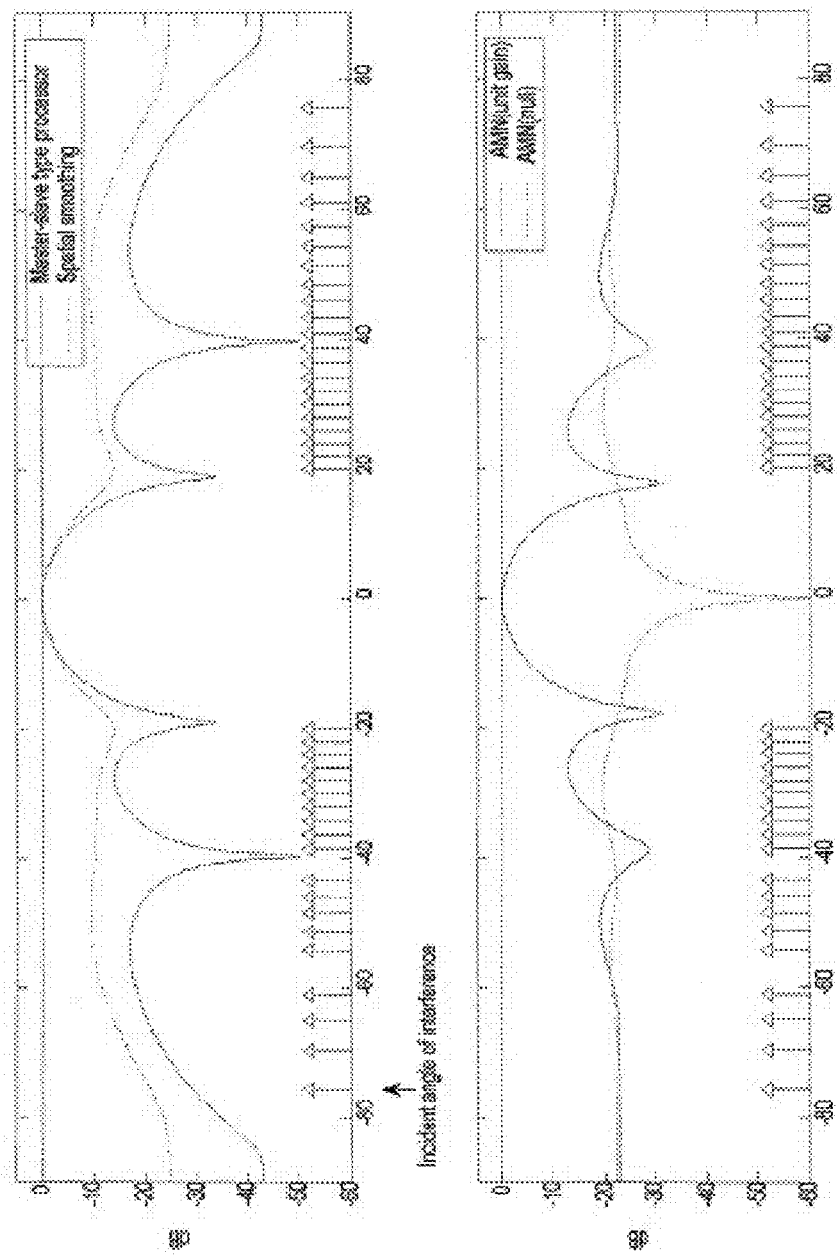

FIG. 17 to FIG. 19 respectively show diagrams representing simulation results in a case of 17 interference signals having the average power ratio of 60.3. FIG. 20 to FIG. 22 respectively show diagrams representing simulation results in a case of 40 interference signals having the average power ratio of 192.1.

As shown in FIG. 17 to FIG. 22, the best performance is achieved in the AMN algorithm according to the exemplary embodiment of the present invention, and the performance of the spatial smoothing approach method is better than that of the master-slave type of processor.

According to the above simulation results, in a case of the low average power ratio (i.e., the low number of interferences), the interference eliminating performance of the AMN algorithm according to the exemplary embodiment of the present invention is degraded compared to the conventional methods. However, in a case of the high average power ratio (i.e., the large number of interferences), the interference eliminating performance is improved compared to the conventional methods. As the number of interferences increases, the difference between performance of the AMN algorithm according to the exemplary embodiment of the present invention and the performance of the conventional method increases.

The above-described method is not only realized by the exemplary embodiment of the present invention, but, on the contrary, is intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiments of the present invention, the interference signal may be efficiently eliminated by the further simplified configuration in the adaptive array system. Particularly, without providing additional hardware, the interference signal may be efficiently eliminated by the AMN algorithm according to the exemplary embodiment of the present invention.

In addition, since the signal cancellation is efficiently eliminated when the interference signal is eliminated, the performance of the adaptive array system may be improved.

What is claimed is:

1. A method for eliminating interference from signals respectively input through a plurality of array elements in an adaptive array system comprising the plurality of array elements, the method comprising:
   a) applying an array weight for eliminating the interference to respective input signals and outputting the input signals;
   b) adding the respective input signals to which the array weight is applied, and generating an array output signal;
   c) updating the array weight based on the array output signal and a first convergence parameter for unit gain constraint; and
   d) updating the array weight based on the array output signal and a second convergence parameter for null constraint,
   wherein a) to d) are performed repeatedly while the array weights updated in the step c) and d) are used in the step a), and then a final array output signal is output.

2. The method of claim 1, wherein the array weight that is updated based on the first convergence parameter and the array weight that is updated based on the second convergence parameter are alternately applied to the input signal to eliminate an interference signal included in the array output signal.

3. The method of claim 1, wherein, in respective c) and d), the first convergence parameter for the unit gain constraint and the second convergence parameter for the null constraint are alternately applied to a linearly constrained least mean square (LMS) algorithm to respectively update the array weight.

4. The method of claim 3, wherein, when the adaptive array system uses a narrow band adaptive array processor, the array weight is updated according to the unit gain constraint so that $$w_{k+1} = \left[I - \frac{c_l c_l^H}{N}\right][w_k - \mu_{u,k} y_k^* x_k] + \frac{c_l}{N}$$

is satisfied and the array weight is updated according to the null constraint so that $$w_{k+1} = \left[I - \frac{c_l c_l^H}{N}\right][w_k - \mu_{u,k} y_k^* x_k]$$

is satisfied, wherein $w_k$ denotes a weight vector at a $k^{th}$ repetition, $x_k$ denotes an input signal vector, I denotes an identity matrix, $y_k$ denotes an array output signal, $\mu_{u,k}$ denotes a first convergence parameter for the unit gain constraint, $\mu_{n,k}$ denotes a second convergence parameter for the null constraint, and k denotes an index indicating the number of repetitions, $c_l$ denotes a steering vector for the set direction, H denotes a Hermitian transpose, N is a number of array elements.

5. The method of claim 3, wherein, when the adaptive array system uses a broadband adaptive array processor, the array weight is updated according to the unit gain constraint so that $w_{k+1}=[I-C(C^TC)^{-1}C^T][w_k-\mu_{u,k}y_k^*x_k]+C(C^TC)^{-1}f$ is satisfied and the array weight is updated according to the null constraint so that $w_{k+1}=[I-C(C^TC)^{-1}C^T][w_k-\mu_{n,k}y_k^*x_k]$ is satisfied, wherein $w_k$ denotes a weight vector at a $k^{th}$ repetition, $x_k$ denotes an input signal vector, I denotes an identity matrix, $y_k$ denotes an array output signal, $\mu_{u,k}$ denotes a first convergence parameter for the unit gain constraint, $\mu_{n,k}$ denotes a second convergence parameter for the null constraint, k denotes an index indicating the number of repetitions, C denotes a constraint matrix, f denotes a constraint vector, and T denotes a transpose.

6. The method of claim 1, wherein, in the interference eliminating method, the array weight is updated in a set direction for estimating an original signal, and a steering vector corresponding to the set direction and a weight vector corresponding to the null constraint are perpendicular to each other.

7. The method of claim 1, wherein, when a) to d) are repeatedly performed, the first and second convergence parameters respectively have fixed values.

8. The method of claim 1, wherein, when a) to d) are repeatedly performed, values of the first and second convergence parameters respectively vary.

9. The method of claim 8, wherein, when the first convergence parameter of the unit gain constraint is lower than a set error, the first and second convergence parameters are established so that the second convergence parameter of the null constraint is higher than the first convergence parameter.

10. The method of claim 1, wherein, while the first and second convergence parameters respectively have fixed values, a first step for repeatedly performing a) to d) a first number of times is performed and a) to d) are repeatedly performed a second number of times, and a second step for varying the first and second convergence parameters is performed when a) to d) are repeatedly performed.

11. An adaptive array processing device for eliminating interference from signals input through a plurality of array elements in an adaptive array system comprising the plurality of array elements, the adaptive array processing device comprising:
- a signal input unit for receiving the input signals;
- a signal processing unit for processing the respective input signals based on respective array weights for eliminating the interference and outputting the processed input signals;
- an array output unit for adding the respective input signals processed as the array weight and outputting the signals as an array output signal; and
- an array weight updating unit for updating the array weight based on the array output signal and supplying the array weight to the signal processing unit,
- wherein the array weight updating unit includes
- a first weight updating unit for processing the array output signal based on a first convergence parameter for unit gain constraint to generate the updated array weight,
- a second weight updating unit for processing the array output signal based on a second convergence parameter for null constraint to generate the updated array weight, and
- an array weight supply unit for alternately supplying the updated array weight output from the first weight updating unit and the updated array weight output from the second weight updating unit to the signal processing unit.

12. The adaptive array processing device of claim 11, further comprising a delay unit for delaying the respective input signals output from the signal input unit and supplying the signals to the signal processing unit.

13. The adaptive array processing device of claim 12, wherein the signal processing unit comprises:
- a plurality of delayers for sequentially delaying the delayed input signal input from the delay unit by a set time, and outputting the signal;
- a plurality of first multipliers for applying the array weight to a signal inputted to one delayer of the plurality of delayers, respectively, and outputting the signal;
- a plurality of second multipliers for applying the array weight to the signal output through the one delayer corresponding to the first multipliers, respectively, and outputting the signal; and
- a plurality of adders for adding the signals output from one first multiplier and one second multiplier, and outputting the signal.

14. The adaptive array processing device of claim 13, wherein the plurality of adders are sequentially arranged, and a last arranged adder adds all the input signals to the delayed input signals multiplied by weight vectors corresponding to the input signals.

15. The adaptive array processing device of claim 11, wherein the first and second weight updating units respectively apply the first convergence parameter for the unit gain constraint and the second convergence parameter for the null constraint to a linearly constrained LMS algorithm to update the array weight.

16. The adaptive array processing device of claim 11, wherein the first and second weight updating units update the array weight in a set direction for estimating an original signal, and wherein a steering vector corresponding to the set direction and a weight vector corresponding to the null constraint are perpendicular to each other.

* * * * *